US012804165B2

(12) United States Patent
Tseng et al.

(10) Patent No.: US 12,804,165 B2
(45) Date of Patent: Nov. 17, 2026

(54) METHOD AND APPARATUS OF INHERITING SHARED CROSS-COMPONENT MODELS IN VIDEO CODING SYSTEMS

(71) Applicant: MEDIATEK INC., Hsinchu City (TW)

(72) Inventors: Hsin-Yi Tseng, Hsinchu City (TW); Chia-Ming Tsai, Hsinchu City (TW); Chih-Wei Hsu, Hsinchu City (TW); Cheng-Yen Chuang, Hsinchu City (TW); Yi-Wen Chen, San Jose, CA (US); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/121,272

(22) PCT Filed: Oct. 26, 2023

(86) PCT No.: PCT/CN2023/126779

§ 371 (c)(1),
(2) Date: Apr. 15, 2025

(87) PCT Pub. No.: WO2024/093785

PCT Pub. Date: May 10, 2024

(65) Prior Publication Data

US 2026/0149812 A1 May 28, 2026

Related U.S. Application Data

(60) Provisional application No. 63/584,517, filed on Sep. 22, 2023, provisional application No. 63/381,943, filed on Nov. 2, 2022.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/196* (2014.11)

(58) Field of Classification Search
CPC .. H04N 19/159; H04N 19/105; H04N 19/176; H04N 19/196
(Continued)

(56) References Cited

U.S. PATENT DOCUMENTS

2018/0205946 A1 7/2018 Zhang
2020/0195970 A1 6/2020 Ikai et al.
(Continued)

FOREIGN PATENT DOCUMENTS

WO 2020149616 A1 7/2020

OTHER PUBLICATIONS

International Search Report and Written Opinion dated Jan. 29, 2024, issued application No. PCT/CN2023/126779.
(Continued)

*Primary Examiner* — James T Boylan
(74) *Attorney, Agent, or Firm* — McClure, Qualey & Rodack, LLP

(57) ABSTRACT

Method and apparatus for inheriting model parameters of a cross-component prediction mode. According to one method, a prediction candidate list comprising inherited cross-component prediction candidates is determined, wherein one or more default candidates are inserted into the prediction candidate list when a total number of candidates in the prediction candidate list is smaller than a maximum number. A target model parameter set associated with a target inherited prediction model is derived based on an inherited model parameter set associated with the target inherited prediction model selected from the prediction candidate list. According to another method, a prediction
(Continued)

candidate list comprising one or more inherited cross-component prediction candidates is determined. One or more single mode prediction model candidates are derived from a multi-mode cross-component candidate and are included in the prediction candidate list.

19 Claims, 12 Drawing Sheets

(51) Int. Cl.
*H04N 19/176* (2014.01)
*H04N 19/196* (2014.01)

(58) Field of Classification Search
USPC .................................................... 375/240.12
See application file for complete search history.

(56) References Cited

U.S. PATENT DOCUMENTS

| | | | | |
|---|---|---|---|---|
| 2021/0314602 | A1* | 10/2021 | Chiang | H04N 19/52 |
| 2022/0201338 | A1 | 6/2022 | Nam | |
| 2022/0329816 | A1 | 10/2022 | Liu | |
| 2024/0187576 | A1* | 6/2024 | Wang | H04N 19/154 |
| 2025/0008087 | A1* | 1/2025 | Huang | H04N 19/105 |
| 2025/0039392 | A1* | 1/2025 | Zhang | H04N 19/137 |
| 2025/0373796 | A1* | 12/2025 | Deng | H04N 19/105 |
| 2026/0046419 | A1* | 2/2026 | Huang | H04N 19/159 |
| 2026/0059102 | A1* | 2/2026 | Huang | H04N 19/105 |

OTHER PUBLICATIONS

EP Search Report dated Jun. 23, 2026 in EP application No. 23884717.2-1207.

M. Coban et al.; “Algorithm description of Enhanced Compression Model 6 (ECM 6)” (retrieved on Oct. 11, 2022).

C.-M. Tsai et al.; “Non-EE2 Cross-component merge mode for chroma intra coding” (retrieved on Jan. 13, 2023).

K. Zhang (Bytedance) et al.; “EE2-1.6 Non-local cross-component prediction and cross-component merge mode” (retrieved on Apr. 4, 2023).

* cited by examiner

Pattern 2

METHOD AND APPARATUS OF INHERITING SHARED CROSS-COMPONENT MODELS IN VIDEO CODING SYSTEMS

CROSS REFERENCE TO RELATED APPLICATIONS

The present invention is a non-Provisional application of and claims priority to U.S. Provisional Patent Application No. 63/381,943, filed on Nov. 2, 2022, and U.S. Provisional Patent Application No. 63/584,517, filed on Sep. 22, 2023. The U.S. Provisional patent application are hereby incorporated by reference in their entireties.

FIELD OF THE INVENTION

The present invention relates to video coding system. In particular, the present invention relates to cross-component prediction model derivation based on inherited cross-component prediction candidates for improving coding performance.

BACKGROUND

Versatile video coding (VVC) is the latest international video coding standard developed by the Joint Video Experts Team (WET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction 110, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

Cross-Component Linear Model (CCLM) Prediction

To reduce the cross-component redundancy, a cross-component linear model (CCLM) (sometimes abbreviated as LM mode) prediction mode is used in the VVC, for which the chroma samples are predicted based on the reconstructed luma samples of the same CU by using a linear model as follows:

$$pred_C(i,j)=\alpha\cdot rec_L'(i,j)+\beta \tag{1}$$

where $pred_C(i, j)$ represents the predicted chroma samples in a CU and $rec_L'(i, j)$ represents the down-sampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM_LA mode is applied;

W'=W+H when LM_A mode is applied;

H'=H+W when LM_L mode is applied.

The above neighbouring positions are denoted as S[0, −1] . . . S[W'−1, −1] and the left neighbouring positions are denoted as S[−1, 0] . . . S[−1, H'−1]. Then the four samples are selected as S[W'/4, −1], S[3*W'/4, −1], S[−1, H'/4], S[−1, 3*H'/4] when LM_LA mode is applied and both above and left neighbouring samples are available;

S[W'/8, −1], S[3*W'/8, −1], S[5*W'/8, −1], S[7*W'/8, −1] when LM_A mode is applied or only the above neighbouring samples are available;

S[−1, H'/8], S[−1, 3*H'/8], S[−1, 5*H'/8], S[−1, 7*H'/8] when LM_L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$Xa = (x0A + x1A + 1) \gg 1; \quad (2)$$

$$Xb = (x0B + x1B + 1) \gg 1;$$

$$Ya = (y0A + y1A + 1) \gg 1;$$

$$Yb = (y0B + y1B + 1) \gg 1$$

Finally, the linear model parameters α and β are obtained according to the following equations.

$$\alpha = \frac{Y_a - Y_b}{X_a - X_b} \quad (3)$$

$$\beta = Y_b - \alpha \cdot X_b \quad (4)$$

FIG. 2 shows an example of the location of the left and above samples and the sample of the current block involved in the LM_LA mode. FIG. 2 shows the relative sample locations of N×N chroma block 210, the corresponding 2N×2N luma block 220 and their neighbouring samples (shown as filled circles).

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

$$DivTable[\ ] = \{0, 7, 6, 5, 5, 4, 4, 3, 3, 2, 2, 1, 1, 1, 1, 0\} \quad (5)$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H) samples. In LM_L mode, only the left template is used to calculate the linear model coefficients. To get more samples, the left template is extended to (H+W) samples.

In LM_LA mode, left and above templates are used to calculate the linear model coefficients.

To match the chroma sample locations for 4:2:0 video sequences, two types of down-sampling filters are applied to luma samples to achieve 2 to 1 down-sampling ratio in both horizontal and vertical directions. The selection of down-sampling filter is specified by a SPS level flag. The two down-sampling filters are as follows, which are corresponding to “type-0” and “type-2” content, respectively.

$$Rec_L'(i, j) = [rec_L(2i-1, 2j-1) + 2 \cdot rec_L(2i, 2j-1) + rec_L(2i+1, 2j-1) + rec_L(2i-1, 2j) + 2 \cdot rec_L(2i, 2j) + rec_L(2i+1, 2j) + 4] \gg 3 \quad (6)$$

$$Rec_L'(i, j) = rec_L(2i, 2j-1) + rec_L(2i-1, 2j) + 4 \cdot rec_L(2i, 2j) + rec_L(2i+1, 2j) + rec_L(2i, 2j+1) + 4] \gg 3 \quad (7)$$

Note that only one luma line (general line buffer in intra prediction) is used to make the down-sampled luma samples when the upper reference line is at the CTU boundary. An exception happens if the top line of the current block is a CTU boundary. In this case, the one-dimensional filter [1, 2, 1]/4 is applied to the above neighboring luma samples in order to avoid the usage of more than one luma line above the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes ({LM_LA, LM_L, and LM_A}, or {CCLM_LT, CCLM_L, and CCLM_T}). The terms of {LM_LA, LM_L, LM_A} and {CCLM_LT, CCLM_L, CCLM_T} are used interchangeably in this disclosure. Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the centre position of the current chroma block is directly inherited.

TABLE 1

Derivation of chroma prediction mode from luma mode when sps_cclm_enabled_flag is true

| Chroma | Corresponding luma intra prediction mode | | | | |
|---|---|---|---|---|---|
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |

TABLE 1-continued

Derivation of chroma prediction mode from luma mode when sps_cclm_enabled_flag is true

| Chroma | Corresponding luma intra prediction mode | | | | |
|---|---|---|---|---|---|
| prediction mode | 0 | 50 | 18 | 1 | X (0 <= X <= 66) |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin indicates whether it is regular (0) or LM modes (1). If it is LM mode, then the next bin indicates whether it is LM_LA (0) or not. If it is not LM_LA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

- If the 32×32 chroma node is not split or partitioned QT split, all chroma CUs in the 32×32 node can use CCLM
- If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular a and β are derived for a particular group). Furthermore, the samples of the current luma block are also classified based on the same rule for the classification of neighbouring luma samples.

FIG. 3 shows an example of classifying the neighbouring samples into two groups. Threshold is calculated as the average value of the neighbouring reconstructed luma samples. A neighbouring sample with $Rec'_L[x,y]$<=Threshold is classified into group 1; while a neighbouring sample with $Rec'_L[x,y]$>Threshold is classified into group 2.

$$\begin{cases} Pred_C[x,y] = \alpha_1 \times Rec'_L[x,y] + \beta_1 & \text{if } Rec'_L[x,y] \le \text{Threshold} \\ Pred_C[x,y] = \alpha_2 \times Rec'_L[x,y] + \beta_2 & \text{if } Rec'_L[x,y] > \text{Threshold} \end{cases} \quad (8)$$

Accordingly, the MMLM uses two models according to the sample level of the neighbouring samples.

Slope Adjustment of CCLM

CCLM uses a model with 2 parameters to map luma values to chroma values as shown in FIG. 4A. The slope parameter "a" and the bias parameter "b" define the mapping as follows:

$$chromaVal = a * lumaVal + b$$

An adjustment "u" to the slope parameter is signalled to update the model to the following form, as shown in FIG. 4B:

$$chromaVal = a' * lumaVal + b'$$

$$\text{where}$$

$$a' = a + u,$$

$$b' = b - u * y_r.$$

With this selection, the mapping function is tilted or rotated around the point with luminance value $y_r$. The average of the reference luma samples used in the model creation as $y_r$ in order to provide a meaningful modification to the model. FIGS. 4A and 4B illustrates the process.

Implementation of Slope Adjustment of CCLM

Slope adjustment parameter is provided as an integer between −4 and 4, inclusive, and signalled in the bitstream. The unit of the slope adjustment parameter is (1/8)-th of a chroma sample value per luma sample value (for 10-bit content).

Adjustment is available for the CCLM models that are using reference samples both above and left of the block (e.g. "LM_CHROMA_IDX" and "MMLM_CHROMA_IDX"), but not for the "single side" modes. This selection is based on coding efficiency versus complexity trade-off considerations. "LM_CHROMA_IDX" and "MMLM_CHROMA_IDX" refers to CCLM_LT and MMLM_LT in this invention. The "single side" modes refer to CCLM_L, CCLM_T, MMLM_L, and MMLM_T in this invention.

When slope adjustment is applied for a multi-model CCLM mode, both models can be adjusted and thus up to two slope updates are signalled for a single chroma block.

Encoder Approach for Slope Adjustment of CCLM

The proposed encoder approach performs an SAID (Sum of Absolute Transformed Differences) based search for the best value of the slope update for Cr and a similar SAID based search for Cb. If either one results as a non-zero slope adjustment parameter, the combined slope adjustment pair (SATD based update for Cr, SATD based update for Cb) is included in the list of RD (Rate-Distortion) checks for the TU.

Convolutional Cross-Component Model (CCCM)—Single Model and Multi-Model

In CCCM, a convolutional model is applied to improve the chroma prediction performance. The convolutional model has 7-tap filter consisting of a 5-tap plus sign shape spatial component, a nonlinear term and a bias term. The input to the spatial 5-tap component of the filter consists of a centre (C) luma sample which is collocated with the chroma sample to be predicted and its above/north (N), below/south (S), left/west (W) and right/east (E) neighbours as shown in FIG. 5.

The nonlinear term (denoted as P) is represented as power of two of the centre luma sample C and scaled to the sample value range of the content:

$$P = (C * C + midVal) \gg bitDepth.$$

For example, for 10-bit contents, the nonlinear term is calculated as:

$$P = (C * C + 512) \gg 10$$

The bias term (denoted as B) represents a scalar offset between the input and output (similarly to the offset term in CCLM) and is set to the middle chroma value (512 for 10-bit content).

Output of the filter is calculated as a convolution between the filter coefficients $c_i$ and the input values and clipped to the range of valid chroma samples:

$$predChromaVal = c_0C + c_1N + c_2S + c_3E + c_4W + c_5P + c_6B$$

The filter coefficients $c_i$ are calculated by minimising MSE between predicted and reconstructed chroma samples in the reference area. FIG. 6 illustrates an example of the reference area which consists of 6 lines of chroma samples above and left of the PU. Reference area extends one PU width to the right and one PU height below the PU boundaries. Area is adjusted to include only available samples. The extensions to the area (indicated as "paddings") are needed to support the "side samples" of the plus-shaped spatial filter in FIG. 5 and are padded when in unavailable areas.

The MSE minimization is performed by calculating autocorrelation matrix for the luma input and a cross-correlation vector between the luma input and chroma output. Autocorrelation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Gradient Linear Model (GLM)

For YUV 4:2:0 color format, a gradient linear model (GLM) method can be used to predict the chroma samples from luma sample gradients. Two modes are supported: a two-parameter GLM mode and a three-parameter GLM mode.

Compared with the CCLM, instead of down-sampled luma values, the two-parameter GLM utilizes luma sample gradients to derive the linear model. Specifically, when the two-parameter GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C = \alpha \cdot G + \beta$$

In the three-parameter GLM, a chroma sample can be predicted based on both the luma sample gradients and down-sampled luma values with different parameters. The model parameters of the three-parameter GLM are derived from 6 rows and columns adjacent samples by the LDL decomposition based MSE minimization method as used in the CCCM.

$$C = \alpha_0 \cdot G + \alpha_1 \cdot L + \alpha_2 \cdot \beta$$

For signalling, when the CCLM mode is enabled for the current CU, one flag is signalled to indicate whether GLM is enabled for both Cb and Cr components. If the GLM is enabled, another flag is signalled to indicate which of the two GLM modes is selected and one syntax element is further signalled to select one of 4 gradient filters (710-740 in FIG. 7) for the gradient calculation.

Spatial Candidate Derivation

The derivation of spatial merge candidates in VVC is the same as that in HEVC except that the positions of first two merge candidates are swapped. A maximum of four merge candidates for current CU 810 are selected among candidates located in the positions depicted in FIG. 8. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 9 are considered and a candidate is only added to the list if the corresponding candidate used for redundancy check does not have the same motion information.

Temporal Candidates Derivation

In this step, only one candidate is added to the list. Particularly, in the derivation of this temporal merge candidate for a current CU 1010, a scaled motion vector is derived based on the co-located CU 1020 belonging to the collocated reference picture as shown in FIG. 10. The reference picture list and the reference index to be used for the derivation of the co-located CU is explicitly signalled in the slice header. The scaled motion vector 1030 for the temporal merge candidate is obtained as illustrated by the dotted line in FIG. 10, which is scaled from the motion vector 1040 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates $C_0$ and $C_1$, as depicted in FIG. 11. If CU at position $C_0$ is not available, is intra coded, or is outside of the current row of CTUs, position $C_1$ is used. Otherwise, position $C_0$ is used in the derivation of the temporal merge candidate.

Non-Adjacent Spatial Candidate

During the development of the VVC standard, a coding tool referred as Non-Adjacent Motion Vector Prediction (NAMVP) has been proposed in JVET-L0399 (Yu Han, et al., "CE4.4.6: Improvement on Merge/Skip mode", Joint Video Exploration Team (WET) of ITU-T SG 16 WP 3 and ISO/IEC JTC 1/SC 29/WG 11, 12th Meeting: Macao, CN, 3-12 Oct. 2018, Document: JVET-L0399). According to the NAMVP technique, the non-adjacent spatial merge candidates are inserted after the TMVP (i.e., the temporal MVP) in the regular merge candidate list. The pattern of spatial merge candidates is shown in FIG. 12. The distances between non-adjacent spatial candidates and current coding block are based on the width and height of current coding block. In FIG. 12, each small square corresponds to a NAMVP candidate and the candidates are ordered (as shown by the number inside the square) according to the distance. The line buffer restriction is not applied. In other words, the NAMVP candidates far away from a current block may have to be stored that may require a large buffer.

In order to further improve the performance of cross-component prediction mode, new methods to derive the cross-component prediction model parameters are disclosed.

BRIEF SUMMARY OF THE INVENTION

A method and apparatus for video coding are disclosed. According to the method, input data associated with a current block comprising a first-colour block and a second-colour block are received, wherein the input data comprise pixel data to be encoded at an encoder side or coded data associated with the current block to be decoded at a decoder side. A prediction candidate list comprising one or more inherited cross-component prediction candidates is determined, wherein one or more default candidates are inserted into the prediction candidate list when a total number of candidates in the prediction candidate list is smaller than a maximum number, and wherein said one or more default candidates are non-zero. A target model parameter set associated with a target inherited prediction model is derived based on an inherited model parameter set associated with the target inherited prediction model selected from the prediction candidate list. The second-colour block is encoded or decoded using prediction data comprising cross-component prediction generated by applying the target inherited prediction model with the target model parameter set to reconstructed first-colour block.

In one embodiment, said one or more default candidates comprise a target default candidate having a final scaling parameter and a pre-defined offset parameter, wherein the final scaling parameter is selected from a pre-defined set. For example, the pre-defined set corresponds to {0, +1/8, −1/8, +2/8, −2/8, +3/8, −3/8, +4/8, −4/8, . . . , +N/8, −N/8}, N is a positive integer.

In one embodiment, said one or more default candidates comprise a target default candidate having a final scaling parameter corresponding to a sum of a previous scaling factor and a delta scaling factor, and wherein the delta scaling factor is selected from a pre-defined set. For example, the pre-defined set corresponds to {+1/8, −1/8, +2/8, −2/8, +3/8, −3/8, +4/8, −4/8, . . . , +N/8, −N/8}, N is a positive integer.

In one embodiment, said one or more default candidates correspond to one or more cross-component mode candidates and each with a scaling parameter $\alpha$ and a pre-defined offset parameter, wherein the pre-defined offset parameter is related to bit depth of the current block or is derived based on neighbouring first-colour samples and neighbouring second-colour samples. For example, the pre-defined offset parameter can be equal to (SecondColourAverage−$\alpha\times$FirstColourAverage), wherein FirstColourAverage corresponds to an average of the neighbouring first-colour samples and SecondColourAverage corresponds to an average of the neighbouring second-colour samples.

In one embodiment, said one or more default candidates correspond to one or more cross-component mode candidates and are inserted into the prediction candidate list according to an order depending on absolute values of scaling parameters or refined scaling parameters associated with cross-component models of said one or more default candidates. In one embodiment, one default candidate with a first absolute value is inserted into the prediction candidate list before another default candidate with a second absolute value larger than the first absolute value.

In one embodiment, said one or more default candidates correspond to one or more GLM (Gradient Linear Model) candidates and are inserted into the prediction candidate list according to an order depending on absolute values of GLM model scaling parameters and GLM filter type associated with said one or more default candidates. In one embodiment, one default candidate with a first absolute value is inserted into the prediction candidate list before another default candidate with a second absolute value larger than the first absolute value. In one embodiment, two or more default candidates with a same GLM filter type are inserted into the prediction candidate list consecutively.

In one embodiment, one or more inherited cross-component prediction candidates comprise one or more inherited spatial neighbouring candidates and/or non-adjacent spatial neighbouring candidates. In one embodiment, said one or more inherited spatial neighbouring candidates and/or non-adjacent spatial neighbouring candidates at pre-defined positions are added into the prediction candidate list in a pre-defined order.

According to another method, a prediction candidate list comprising one or more inherited cross-component prediction candidates is determined, wherein one or more single mode prediction model candidates are inserted into the prediction candidate list when a total number of candidates in the prediction candidate list is smaller than a maximum number and when at least one multi-mode cross-component candidate is included in the prediction candidate list, and wherein one or more single-mode model parameter sets associated with said one or more single-mode prediction model candidates are derived based on at least one inherited model parameter set associated with said at least one multi-mode cross-component candidate. The second-colour block is encoded or decoded using prediction data comprising cross-component prediction generated by applying a target inherited prediction model selected from the prediction candidate list.

In one embodiment, said at least one multi-mode cross-component candidate corresponds to MMLM (Multiple Model CCLM (Cross-Component Linear Model)), or CCCM (Convolutional Cross-Component Model) with multi-model. In one embodiment, one of said one or more single-mode prediction model candidates inserted into the prediction candidate list corresponds to one of two models associated with said at least one multi-mode cross-component candidate.

DETAILED DESCRIPTION OF THE INVENTION

Figure 1A:
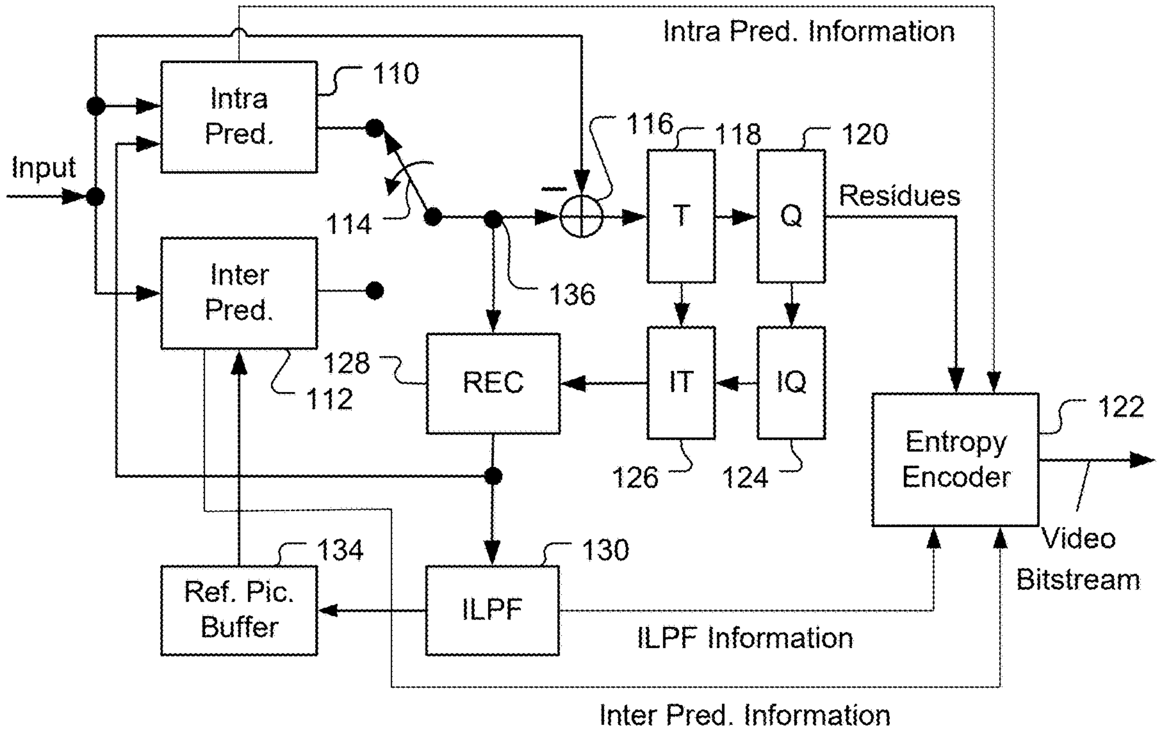
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In order to improve the prediction accuracy or coding performance of cross-component prediction, various schemes related to inheriting cross-component models are disclosed.

Guided Parameter Set for Refining the Cross-Component Model Parameters

According to this method, the guided parameter set is used to refine the derived model parameters by a specified CCLM mode. For example, the guided parameter set is explicitly signalled in the bitstream, after deriving the model parameters, the guided parameter set is added to the derived model parameters as the final model parameters. The guided parameter set contain at least one of a differential scaling parameter (dA), a differential offset parameter (dB), and a differential shift parameter (dS). For example, equation (1) can be rewritten as:

$$pred_C(i,j) = ((\alpha' \cdot rec_L'(i,j)) \gg s) + \beta,$$

and if dA is signalled, the final prediction is:

$$pred_C(i,j) = (((\alpha' + dA) \cdot rec_L'(i,j)) \gg s) + \beta.$$

Similarly, if dB is signalled, then the final prediction is:

$$pred_C(i,j) = ((\alpha' \cdot rec_L'(i,j)) \gg s) + (\beta + \mathrm{dB}).$$

If dS is signalled, then the final prediction is:

$$pred_C(i,j) = ((\alpha' \cdot rec_L'(i,j)) \gg (s + dS)) + \beta.$$

If dA and dB are signalled, then the final prediction is:

$$pred_C(i, j) = (((\alpha' + dA) \cdot rec_L'(i, j)) \gg s) + (\beta + \text{dB}).$$

The guided parameter set can be signalled per colour component. For example, one guided parameter set is signalled for Cb component, and another guided parameter set is signalled for Cr component. Alternatively, one guided parameter set can be signalled and shared among colour components. The signalled dA and dB can be a positive or negative value. When signalling dA, one bin is signalled to indicate the sign of dA. Similarly, when signalling dB, one bin is signalled to indicate the sign of dB.

For another embodiment, dA and dB can be the LSB (Least Significant Bits) part of the final scaling and offset parameters. For example, if m bits are required to represent the final scaling parameters, then dA is the LSB part of the final scaling parameters, and n bits (m>n) are used to represent dA, where the MSB (Most Significant Bit) part (m–n bits) of the final scaling parameters are implicitly derived. In other words, for the final scaling parameters, the MSB part of the final scaling parameters is taken from the MSB part of α', and the LSB part of the final scaling parameters is from the signalled dA. Similarly, if p bits are required to represent the final offset parameters, dB is the LSB of the final offset parameters, and q bits (p>q) are used to represent dB, where the MSB part (p–q bits) of the final offset parameters are implicitly derived. In other words, for the final offset parameters, the MSB part of the final offset parameters is taken from the MSB part of β, and the LSB part of the final offset parameters is from the signalled dB.

For another embodiment, if dA is signalled, dB can be implicitly derived from the average value of neighbouring (e.g. L-shape) reconstructed samples. For example, in VVC, four neighbouring luma and chroma reconstructed samples are selected to derived model parameters. Suppose the average value of neighbouring luma and chroma samples are lumaAvg and chromaAvg, then β is derived by β=chromaAvg–(α'+dA)·lumaAvg. The average value of neighbouring luma samples (i.e., lumaAvg) can be calculated by all selected luma samples, the luma DC mode value of the current luma CB, or the average of the maximum and minimum luma samples $$\left(\text{e.g., } lumaAvg = \left(\text{Max}\left(x_A^0, x_A^1\right) + \text{Min}\left(x_B^0, x_B^1\right) + 1\right) \gg 1,\right.$$
$$\left.\text{or } lumaAvg = \left(\text{Min}\left(x_A^0, x_A^1\right) + \text{Max}\left(x_B^0, x_B^1\right) + 1\right) \gg 1\right).$$

Similarly, average value of neighbouring chroma samples (i.e., chromaAvg) can be calculated by all selected chroma samples, the chroma DC mode value of the current chroma CB, or the average of the maximum and minimum chroma samples $$\left(\text{e.g., } chromaAvg = \left(\text{Max}\left(y_A^0, y_A^1\right) + \text{Min}\left(y_B^0, y_B^1\right) + 1\right) \gg 1,\right.$$
$$\left.\text{or } chromaAvg = \left(\text{Min}\left(y_A^0, y_A^1\right) + \text{Max}\left(y_B^0, y_B^1\right) + 1\right) \gg 1\right).$$

Note, for non-4:4:4 colour subsampling format, the selected neighbouring luma reconstructed samples can be from the output of CCLM down-sampling process.

For another embodiment, the shift parameter, s, can be a constant value (e.g., s can be 3, 4, 5, 6, 7, or 8), and dS is equal to 0 and no need to be signalled.

For another embodiment, in MMLM, the guided parameter set can also be signalled per model. For example, one guided parameter set is signalled for one model and another guided parameter set is signalled for another model. Alternatively, one guided parameter set is signalled and shared among linear models. Or only one guided parameter set is signalled for one selected model, and another model is not further refined by guided parameter set.

In another embodiment, the MSB part of α' is selected according to the costs of possible final scaling parameters. That is, one possible final scaling parameter is derived according to the signalled dA and one possible value of MSB for α'. For each possible final scaling parameter, the cost defined by the sum of absolute difference between neighbouring reconstructed chroma samples and corresponding chroma values generated by the CCLM model with the possible final scaling parameter is calculated and the final scaling parameter is the one with the minimum cost. In one embodiment, the cost function is defined as the summation of square error.

Inherit Neighbouring Model Parameters for Refining the Cross-Component Model Parameters The final scaling parameter of the current block is inherited from the neighbouring blocks and further refined by dA (e.g., dA derivation or signalling can be similar or the same as the method in the previous "Guided parameter set for refining the cross-component model parameters"). Once the final scaling parameter is determined (e.g., the inherited scaling parameter is refined), the offset parameter (e.g., β in CCLM) is derived based on the inherited scaling parameter and the average value of neighbouring luma and chroma samples of the current block. For example, if the final scaling parameter is inherited from a selected neighbouring block, and the inherited scaling parameter is $\alpha'_{nei}$, then the final scaling parameter is ($\alpha'_{nei}$+dA). For yet another embodiment, the final scaling parameter is inherited from a historical list and further refined by dA. For example, the historical list records the most recent j entries of final scaling parameters from previous CCLM-coded blocks. Then, the final scaling parameter is inherited from one selected entry of the historical list, $\alpha'_{list}$, and the final scaling parameter is ($\alpha'_{list}$+dA). For yet another embodiment, the final scaling parameter is inherited from a historical list or the neighbouring blocks, but only the MSB (Most Significant Bit) part of the inherited scaling parameter is taken, and the LSB (Least Significant Bit) of the final scaling parameter is from dA. For yet another embodiment, the final scaling parameter is inherited from a historical list or the neighbouring blocks, but does not further refine by dA.

For yet another embodiment, after inheriting model parameters, the offset parameter can be further refined by dB. For example, if the final offset parameter is inherited from a selected neighbouring block, and the inherited offset parameter is $\beta'_{nei}$, then the final offset parameter is ($\beta'_{nei}$+dB). For still another embodiment, the final offset parameter is inherited from a historical list and further refined by dB. For example, the historical list records the most recent j entries of final scaling parameters from previous CCLM-coded blocks. Then, the final scaling parameter is inherited from one selected entry of the historical list, $\beta'_{list}$, and the final scaling parameter is ($\beta'_{list}$+dB). For yet another embodiment, the final offset parameter is inherited from a historical list or the neighbouring blocks, but is not further refined by dB.

For yet another embodiment, if the inherited neighbour block is coded with CCCM, the filter coefficients ($c_i$) are inherited. The offset parameter (e.g., $c_6 \times B$ or $c_6$ in CCCM) can be re-derived based on the inherited parameter and the average value of neighbouring corresponding position luma and chroma samples of the current block. For still another embodiment, only partial filter coefficients are inherited (e.g., only n out of 7 filter coefficients are inherited, where $1 \le n < 7$), the rest filter coefficients are further re-derived using the neighbouring luma and chroma samples of the current block.

For still another embodiment, if the inherited candidate applies GLM gradient pattern to its luma reconstructed samples, the current block shall also inherit the GLM gradient pattern of the candidate and apply to the current luma reconstructed samples.

For still another embodiment, if the inherited neighbour block is coded with multiple cross-component models (e.g., MMLM, or CCCM with multi-model), the classification threshold is also inherited to classify the neighbouring samples of the current block into multiple groups, and the inherited multiple cross-component model parameters are further assigned to each group. For yet another embodiment, the classification threshold is the average value of the neighbouring reconstructed luma samples, and the inherited multiple cross-component model parameters are further assigned to each group. Similarly, once the final scaling parameter of each group is determined, the offset parameter of each group is re-derived based on the inherited scaling parameter and the average value of neighbouring luma and chroma samples of each group of the current block. For another example, if CCCM with multi-model is used, once the final coefficient parameter of each group is determined (e.g., $c_0$ to $c_5$ except for $c_6$ in CCCM), the offset parameter (e.g., $c_6 \times B$ or $c_6$ in CCCM) of each group is re-derived based on the inherited coefficient parameter and the neighbouring luma and chroma samples of each group of the current block.

For still another embodiment, inheriting model parameters may depend on the colour component. For example, Cb and Cr components may inherit model parameters or model derivation method from the same candidate or different candidates. For yet another example, only one of colour components inherits model parameters, and the other colour component derives model parameters based on the inherited model derivation method (e.g., if the inherited candidate is coded by MMLM or CCCM, the current block also derives model parameters based on MMLM or CCCM using the current neighbouring reconstructed samples). For still another example, only one of colour components inherits model parameters, and the other colour component derives its model parameters using the current neighbouring reconstructed samples.

For yet another embodiment, after decoding a block, a cross-component model of the current block is derived and stored for later reconstruction process of neighbouring blocks using inherited neighbouring model parameters. For example, even the current block is coded by inter prediction, the cross-component model parameters of the current block can be derived by using the current luma and chroma reconstruction or prediction samples. Later, if another block is predicted by using inherited neighbours model parameters, it can inherit the model parameters from the current block. For another example, the current block is coded by cross-component prediction, the cross-component model parameters of the current block are re-derived by using the current luma and chroma reconstruction or prediction samples. For another example, the stored cross-component model can be CCCM, LM_LA (i.e., single model LM using both above and left neighbouring samples to derive model), or MMLM_LT (i.e., multi-model LM using both above and left neighbouring samples to derive model).

Inherit Spatial Neighbouring Model Parameters

For another embodiment, the inherited model parameters can be from a block that is an immediate neighbouring block. The models from blocks at pre-defined positions are added into the candidate list in a pre-defined order. For example, the pre-defined positions can be the positions depicted in FIG. 8, and the pre-defined order can be $B_0$, $A_0$, $B_1$, $A_1$ and $B_2$, or $A_0$, $B_0$, $B_1$, $A_1$ and $B_2$. The block can be a chroma block or a single-tree luma block.

For still another embodiment, the pre-defined positions include the positions immediately above the centre position of the top line of the current block if W is greater than or equal to TH. Assume the position of the current chroma block is at (x, y), the pre-defined positions can be $(x+(W>>1), y-1)$ or $(x+(W>>1)-1, y-1)$. The pre-defined positions also include the positions at the immediate left of the centre position of the left line of the current block if H is greater than or equal to TH. The pre-defined positions can be $(x-1, (H>>1))$ or $(x-1, (H>>1)-1)$ position. W and H are the width and height of the current chroma block, and TH is a threshold value which can be 2, 4, 8, 16, 32, or 64.

Figure 8:
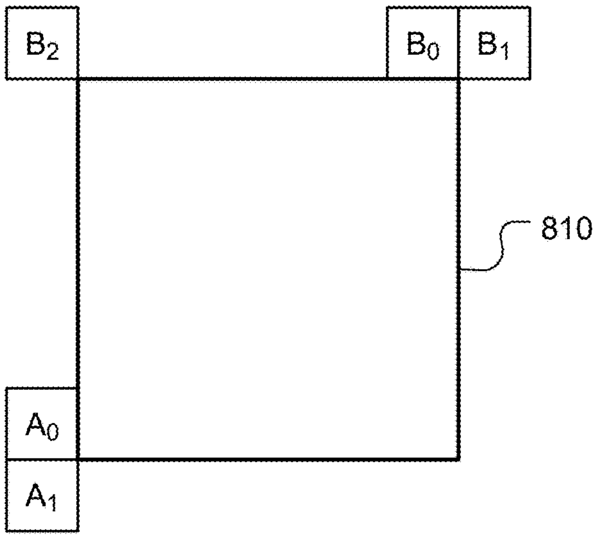
FIG. 8 illustrates the neighbouring blocks used for deriving spatial merge candidates for VVC.
Figure 9:
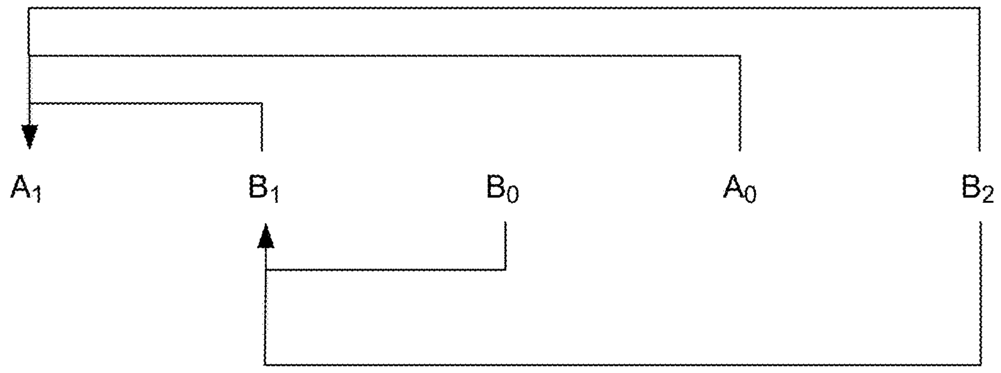
FIG. 9 illustrates the possible candidate pairs considered for redundancy check in VVC.
Figure 10:
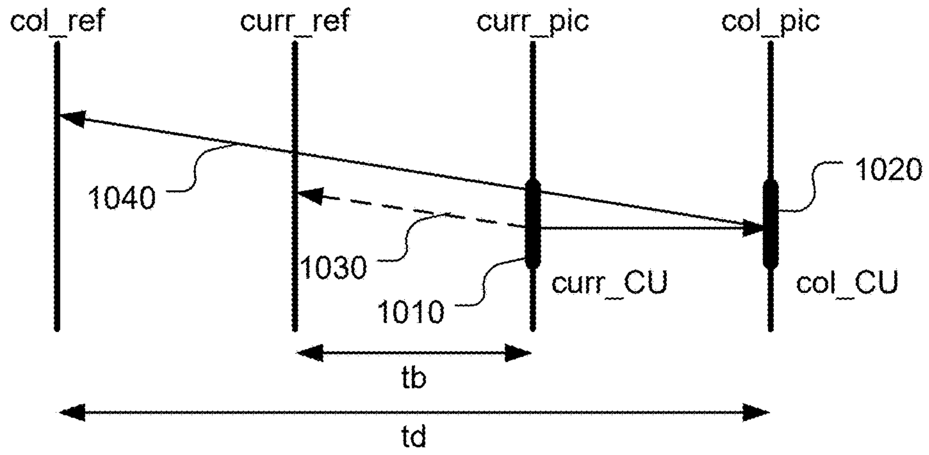
FIG. 10 illustrates an example of temporal candidate derivation, where a scaled motion vector is derived according to POC (Picture Order Count) distances.
Figure 11:
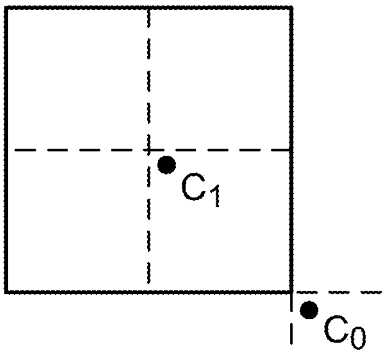
FIG. 11 illustrates the position for the temporal candidate selected between candidates $C_0$ and $C_1$.

For still another embodiment, the maximum number of inherited models from spatial neighbours are smaller than the number of pre-defined positions. For example, if the pre-defined positions are as depicted in FIG. 8, there are 5 pre-defined positions. If pre-defined order is $B_0$, $A_0$, $B_1$, $A_1$ and $B_2$, and the maximum number of inherited models from spatial neighbours is 4, the model from $B_2$ is added into the candidate list only when one of preceding blocks is not available or is not coded in cross-component model.

Inheriting Temporal Neighbouring Model Parameters

Figure 13:
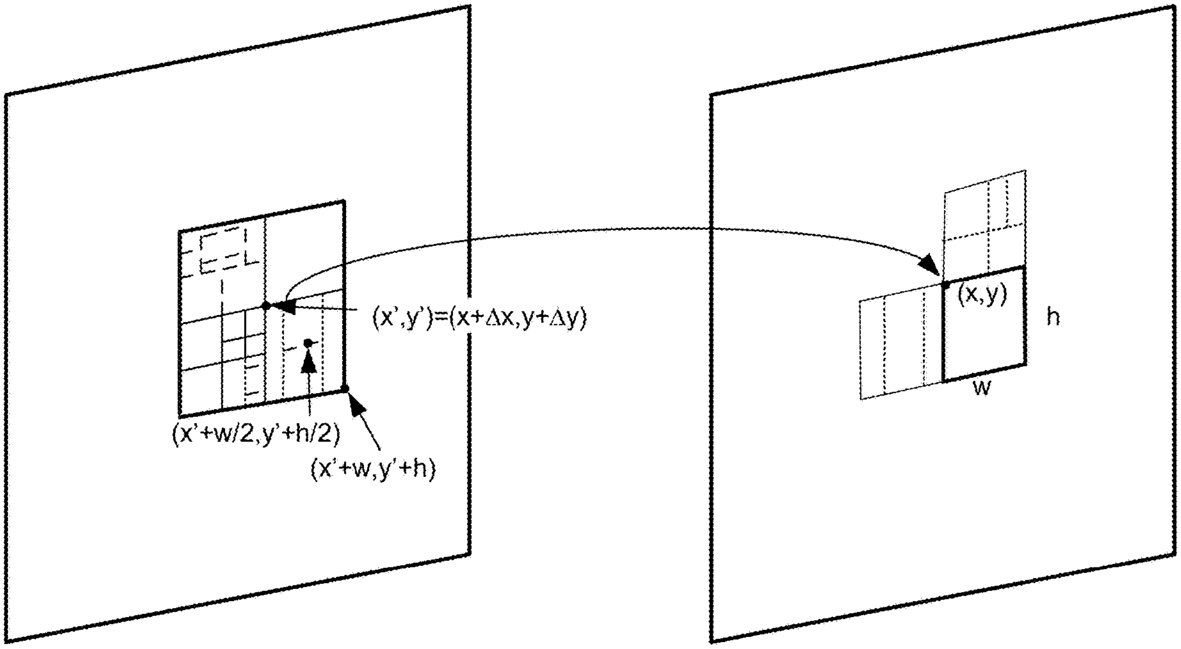
FIG. 13 illustrates an example of inheriting temporal neighbouring model parameters.

For still another embodiment, if the current slice/picture is a non-intra slice/picture, the inherited model parameters can be from the block in the previous coded slices/pictures. For example, as shown in the FIG. 13, the current block position is at (x, y) and the block size is w×h. The inherited model parameters can be from the block at position (x', y'), (x', y'+h/2), (x'+w/2, y'), (x'+w/2, y'+h/2), (x'+w, y'), (x', y'+h), or (x'+w, y'+h) of the previous coded slices/picture, where $x'=x+\Delta x$ and $y'=y+\Delta y$. In one embodiment, if the prediction mode of the current block is intra, $\Delta x$ and $\Delta y$ are set to 0. If the prediction mode of the current block is inter prediction, $\Delta x$ and $\Delta y$ are set to the horizontal and vertical motion vectors of the current block. In another embodiment, if the current block is inter bi-prediction, $\Delta x$ and $\Delta y$ are set to the horizontal and vertical motion vectors in reference picture list 0. In still another embodiment, if the current block is inter bi-prediction, $\Delta x$ and $\Delta y$ are set to the horizontal and vertical motion vectors in reference picture list 1.

For still another embodiment, if the current block is inter bi-prediction, the inherited model parameters can be from the block in the previous coded slices/pictures in the reference lists. For example, if the horizontal and vertical parts of the motion vector in reference picture list 0 are $\Delta x_{L0}$ and $\Delta y_{L0}$, the motion vector can be scaled to other reference pictures in the reference list 0 and 1. If the motion vector is scaled to the $i^{th}$ reference picture in the reference list 0 as $(\Delta x_{L0,i0}, \Delta y_{L0,i0})$. The model can be from the block in the $i^{th}$ reference picture in the reference list 0, and $\Delta x$ and $\Delta y$ are set to $(\Delta x_{L0,i0}, \Delta y_{L0,i0})$. For another example, if the horizontal and vertical parts of the motion vector in reference picture list 0 are $\Delta x_{L0}$ and $\Delta y_{L0}$, the motion vector is scaled to the $i^{th}$ reference picture in the reference list 1 as ($\Delta x_{L0,i1}$, $\Delta y_{L0,i1}$). The model can be from the block in the $i^{th}$ reference picture in the reference list 1, and Δx and Δy are set to ($\Delta x_{L0,i1}$, $\Delta y_{L0,i1}$).

Inherit Non-Adjacent Spatial Neighbouring Models

Figure 12:
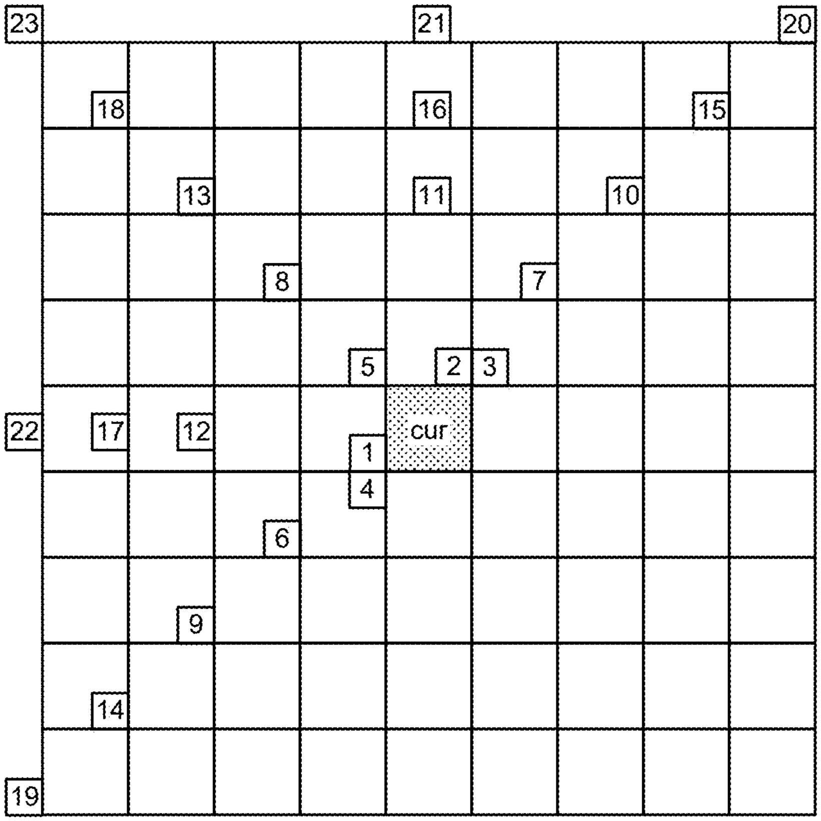
FIG. 12 illustrates an exemplary pattern of the non-adjacent spatial merge candidates.

For another embodiment, the inherited model parameters can be from blocks that are non adjacent spatial neighbouring blocks. The models from blocks at pre-defined positions are added into the candidate list in a pre-defined order. For example, the positions and the order can be as depicted in FIG. 12. Each small square represents a candidate position and the number inside the square indicates the pre-defined order. The distances between each position and the current block are based on the width and height of the current coding block. For another example, the positions and the order can be as depicted in FIG. 14, where two patterns (1410 and 1420) are shown. Each small square represents a candidate position and the number inside the square indicates the pre-defined order. The positions in pattern 1 (1410) are added into the candidate list before the positions in pattern 2 (1420). The distances between each position and the current block are based on the width and height of the current coding block.

For another embodiment, the distances between the positions that are closer to the current encoding block are smaller than the distances between the positions that are further away from the current block.

Figure 14A:
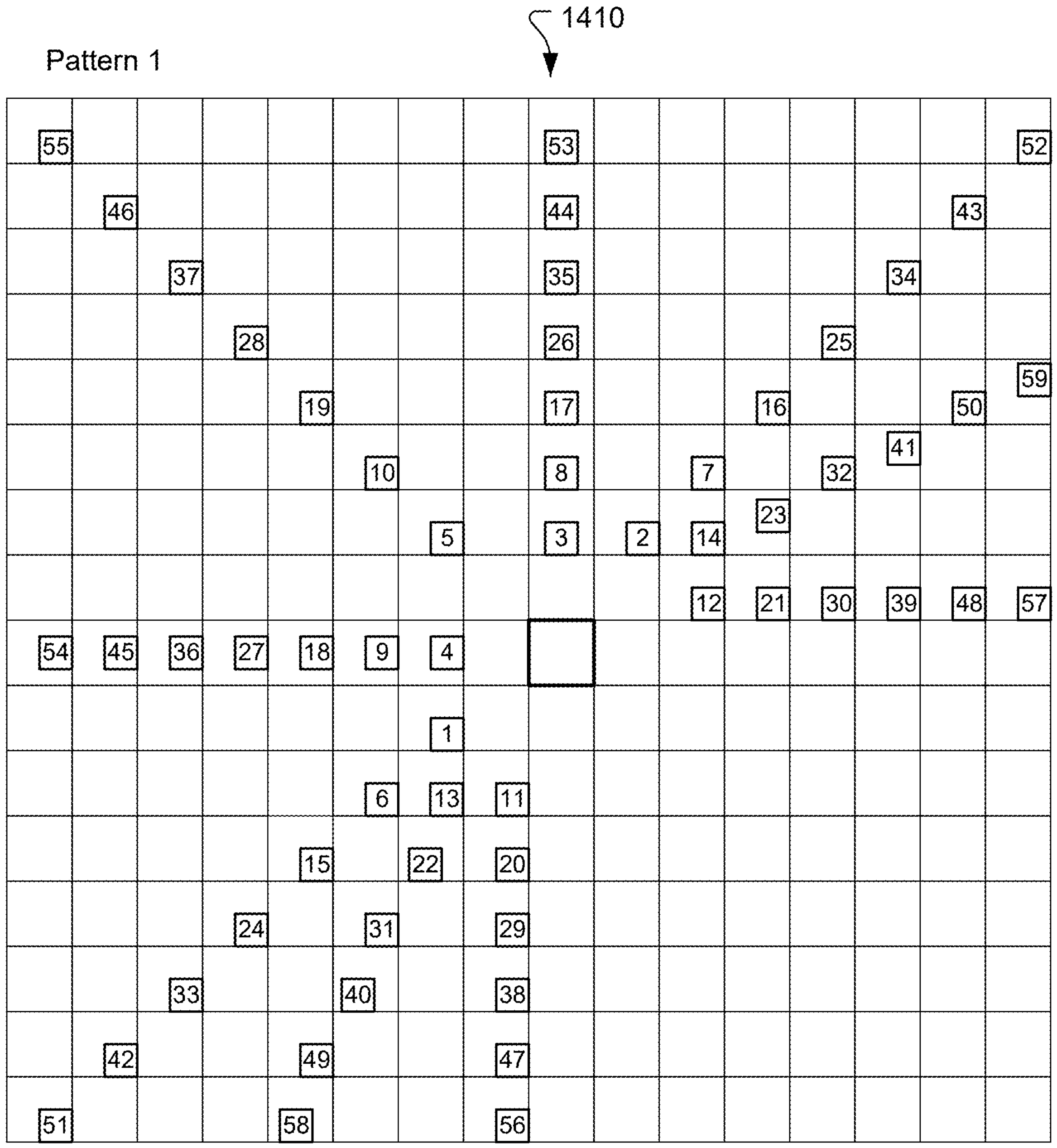
FIGS. 14A-B illustrate two search patterns for inheriting non-adjacent spatial neighbouring models.
Figure 14B:
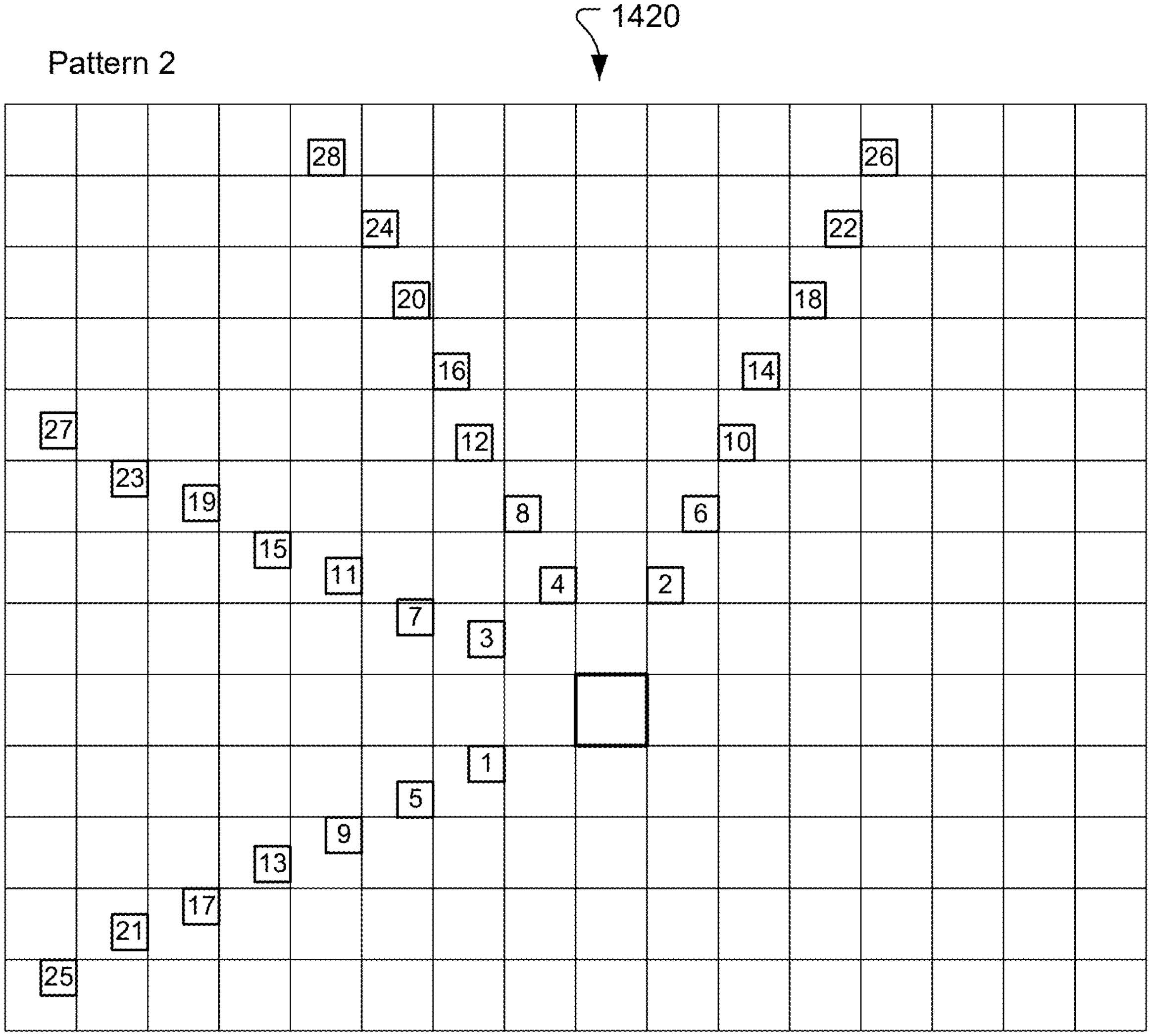

For still another embodiment, the maximum number of inherited models from non-adjacent spatial neighbours that can be added into the candidate list is smaller than the number of pre-defined positions. For example, if the pre-defined positions are as depicted in FIG. 14A and FIG. 14B. If the maximum number of inherited models from non-adjacent spatial neighbours that can be added into the candidate list is N, the models from positions in pattern 2 (1420) in FIG. 14B are added into the candidate list only when the number of available cross-component models from positions in pattern 1 (1410) in FIG. 14A is smaller than N.

Models Generated Based on Other Inherited Models

In another embodiment, a single cross-component model can be generated from a multiple cross-component model. The single cross-component model can then be added into the candidate list.

In one embodiment, after inherited candidates (e.g., spatial neighbour candidates, temporal neighbour candidates, non-adjacent neighbour candidates or history candidates) are added in the candidate list, if there exist candidates coded with multiple cross-component models (e.g., MMLM, CCCM with multi-model, or other CCCM variants with multi-model), a single cross-component model can be generated based on the existing multiple cross-component models. As described in "Multiple Model CCLM (MMLM)" and "Convolutional cross-component model (CCCM)—single model and multi-model", let the model used for samples in group 1 be denoted as model 1 and the model used for samples in group 2 be denoted as model 2, a single cross-component model (e.g., CCLM or CCCM) can be generated by selecting model 1 or model 2.

In one embodiment, both model 1 and model 2 are added into the candidate list. In another embodiment, only model 1 is added into the candidate list. For another example, only model 2 is added into the candidate list.

For another example, if a candidate is coded with multiple cross-component models (e.g., MMLM, or CCCM with multi-model), a single cross-component model can be generated by selecting the first or the second cross-component model in the multi cross-component models.

Candidate List Construction

In one embodiment, the candidate list is constructed by adding candidates in a pre-defined order until the maximum candidate number is reached. The candidates added may include all or some of the aforementioned candidates, but not limited to the aforementioned candidates. For example, the candidate list may include spatial neighbouring candidates, temporal neighbouring candidate, historical candidates, non-adjacent neighbouring candidates, single model candidates generated based on other inherited models (as mentioned in section entitled: Models generated based on other inherited models) or combined model (as mentioned later in section entitled: Inheriting multiple cross-component models). For another example, the candidate list includes the same candidates as previous example, but the candidates are added into the list in a different order.

In another embodiment, if all the pre-defined neighbouring and historical candidates are added but the maximum candidate number is not reached, some default candidates are added into the candidate list until the maximum candidate number is reached.

In one sub-embodiment, the default candidates include but not limited to the candidates described below. The default candidates are CCLM models: $pred_C(i, j)=\alpha \cdot rec_L'(i, j)+\beta$. The final scaling parameter α is from the set {0, +1/8, −1/8, +2/8, −2/8, +3/8, −3/8, +4/8, −4/8, . . . , +N/8, −N/8}, where N is a positive integer. The offset parameter β can be 1/(1<<bit_depth) (i.e., for 10-bit contents, β=512) or is derived based on neighbouring luma and chroma samples. For example, if the average value of neighbouring luma and chroma samples are lumaAvg and chromaAvg, then β is derived by β=chromaAvg−α·lumaAvg.

The average value of neighbouring luma samples (i.e., lumaAvg) can be calculated by all selected luma samples, the luma DC mode value of the current luma CB (Coding Block), or the average of the maximum and minimum luma samples $$\left(\text{e.g., } lumaAvg = \left(\text{Max}\left(x_A^0, x_A^1\right) + \text{Min}\left(x_B^0, x_B^1\right) + 1\right) \gg 1,\right.$$
$$\left.\text{or } lumaAvg = \left(\text{Min}\left(x_A^0, x_A^1\right) + \text{Max}\left(x_B^0, x_B^1\right) + 1\right) \gg 1\right),$$

as described in "Guided parameter set for refining the cross-component model parameters"). Similarly, average value of neighbouring chroma samples (i.e., chromaAvg) can be calculated by all selected chroma samples, the chroma DC mode value of the current chroma CB, or the average of the maximum and minimum chroma samples $$\left(\text{e.g., } chromaAvg = \left(\text{Max}\left(y_A^0, y_A^1\right) + \text{Min}\left(y_B^0, y_B^1\right) + 1\right) \gg 1,\right.$$
$$\left.\text{or } chromaAvg = \left(\text{Min}\left(y_A^0, y_A^1\right) + \text{Max}\left(y_B^0, y_B^1\right) + 1\right) \gg 1\right),$$

as described in "Guided parameter set for refining the cross-component model parameters").

The order in which the CCLM models are added into the candidate list is based on the absolute value of the CCLM model's scaling parameter. The CCLM models corresponding to smaller absolute value of the scaling parameter are added into the candidate list earlier. For one example, the CCLM models are added into the candidate list in the following order: α=0, +1/8, −1/8, +2/8, −2/8, +3/8, −3/8, +4/8, −4/8, . . . , +N/8, −N/8 For another example, the CCLM models are added into the candidate list in the following order: α=0, −1/8, +1/8, +1/8, −2/8, +2/8, −3/8, +3/8, −4/8, +4/8, . . . , −N/8, +N/8.

In another sub-embodiment, the default candidates include but not limited to the candidates described below. The default candidates are two-parameter GLM models: α·G+β, where G is the luma sample gradients instead of down-sampled luma samples L. The 4 GLM filters described in the section, entitled Gradient Linear Model (GLM), are applied. The final scaling parameter α is from the set {0, 1/8, −1/8, +2/8, −2/8, +3/8, −3/8, +4/8, −4/8, . . . , +N/8, −N/8}, where N is a positive integer. The offset parameter β can be 1/(1<<bit_depth) (i.e., for 10-bit contents, β=512) or is derived based on neighbouring luma and chroma samples.

Figure 7:
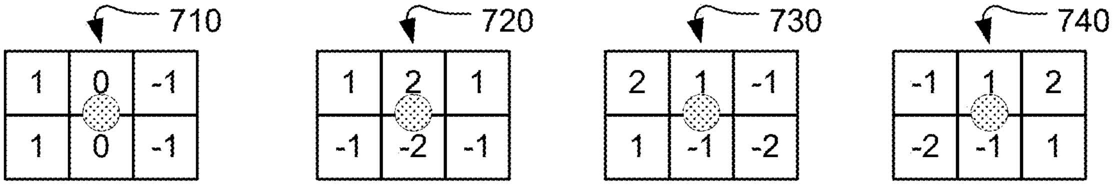
FIG. 7 illustrates the 4 gradient patterns for Gradient Linear Model (GLM).

The order in which the GLM models are added into the candidate list is based on the absolute value of the GLM model's scaling parameter and the type of the GLM filter used. In one sub-embodiment, the GLM models corresponding to a smaller absolute value of the scaling parameter are added into the candidate list earlier. In one sub-embodiment, the GLM models correspond to the same GLM filter are added into the candidate list consecutively. The aforementioned rules can be combined. For one example, the GLM models are added into the candidate list in the following order: (GLM filter, α)=(710, 0), (710, +1/8), (710, −1/8), . . . , (710, −N/8), (720, +1/8), . . . , (720, −N/8), (730, +1/8), . . . , (730, −N/8), (740, +1/8), . . . , (740, −N/8), where GLM filter 710, 720, 730 and 740 are as depicted in FIG. 7. For one example, the GLM models are added into the candidate list in the following order: (GLM filter, α)=(710, 0), (710, +1/8), (720, +1/8), (730, +1/8), (740, +1/8), (710, −1/8), . . . , (740, −N/8), where GLM filter 710, 720, 730 and 740 are as depicted in FIG. 7.

In another embodiment, a default candidate can be derived based on an earlier candidate in the candidate list with a delta scaling parameter refinement. In one sub-embodiment, the earlier candidate is a CCLM model. Assume the scaling parameter and the offset parameter of the earlier candidate are α and β, respectively. The default candidates are CCLM models whose scaling parameter α'=(α+Δα), where Δα can be 1/8, −1/8, +2/8, −2/8, +3/8, −3/8, +4/8, −4/8, . . . , +N/8, −N/8 and N is an positive integer. The offset parameter β' of the default candidates can be a pre-define value, the same value as the offset parameter β of the earlier candidate (i.e., β'=β), or a derived value. For example, the offset parameter of the default candidate is 1/(1<<bit_depth) (i.e., for 10-bit contents, β'=512). For another example, β' can be derived based on the average value of neighbouring luma and chroma samples of the current block, with scaling factor α'.

In one sub-embodiment, the earlier candidate can be the candidate which is the first CCLM model added to the candidate list.

In one sub-embodiment, the order in which the default candidates (i.e., CCLM models with refined scaling parameter) are added into the candidate list is based on the absolute value of the refinement value Da. The CCLM models corresponding to smaller absolute value of the refinement value are added into the candidate list earlier. For one example, the CCLM models are added into the candidate list in the following order: α'=α, α+1/8, α−1/8, α+2/8, α−2/8, α+3/8, α−3/8, α+4/8, α−4/8, . . . , α+N/8, α−N/8. For another example, the CCLM models are added into the candidate list in the following order: α'=α, α−1/8, α+1/8, α−2/8, α+2/8, α−3/8, α+3/8, α−4/8, α+4/8, . . . , α−N/8, α+N/8.

Removing or Modifying Similar Neighbouring Model Parameters

When inheriting cross-component model parameters from other blocks, it can further check the similarity between the inherited model and the existing models in the candidate list or those model candidates derived by the neighbouring reconstructed samples of the current block (e.g., models derived by CCLM, MMLM, or CCCM using the neighbouring reconstructed samples of the current block). If the model of a candidate is similar to the existing models, the model will not be included in the candidate list. In one embodiment, it can compare the similarity of (α×lumaAvg+β) or α among existing candidates to decide whether to include the model of a candidate or not. For example, if the (α×lumaAvg+β) or α of the candidate is the same as one of the existing candidates, the model of the candidate is not included. For another example, if the difference of (α×lumaAvg+β) or α between the candidate and one of existing candidates is less than a threshold, the model of the candidate is not included. Besides, the threshold can be adaptive based on coding information (e.g., the current block size or area). For another example, when comparing the similarity, if the model of a candidate and the existing model both use CCCM, it can compare similarity by checking the value of ($c_0C+c_1N+c_2S+c_3E+c_4W+c_5P+c_6B$) to decide whether to include the model of a candidate or not. In another embodiment, if the position of a candidate is located in the same CU as one of the existing candidates, the model of the candidate is not included. In still another embodiment, if the model of a candidate is similar to one of existing candidate models, it can adjust the inherited model parameters so that the inherited model is different from the existing candidate models. For example, if the inherited scaling parameter is similar to one of existing candidate models, the inherited scaling parameter can add a predefined offset (e.g., 1>>S or −(1>>S), where S is the shift parameter) so that the inherited parameter is different from the existing candidate models.

Reordering the Candidates in the List

The candidates in the list can be reordered to reduce the syntax overhead when signalling the selected candidate index. The reordering rules can depend on the coding information of neighbouring blocks or the model error. For example, if neighbouring above or left blocks are coded by MMLM, the MMLM candidates in the list can be moved to the head of the current list. Similarly, if neighbouring above or left blocks are coded by single model LM or CCCM, the single model LM or CCCM candidates in the list can be moved to the head of the current list. Similarly, if GLM is used by neighbouring above or left blocks, the GLM related candidates in the list can be moved to the head of the current list.

Figure 15:
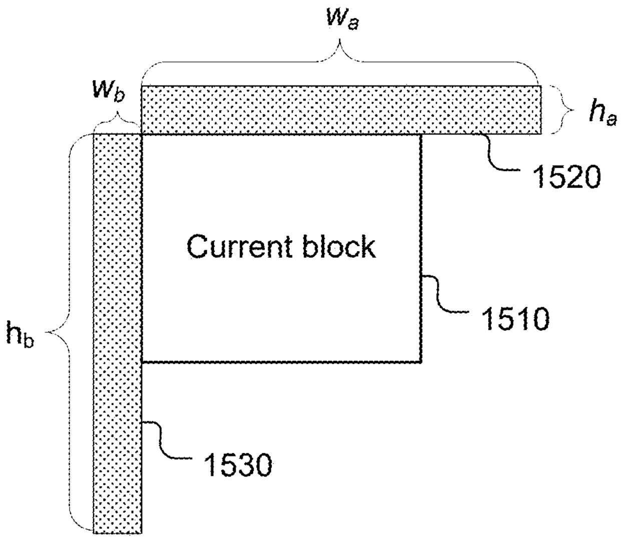
FIG. 15 illustrates an example of neighbouring templates for calculating model error.

In still another embodiment, the reordering rule is based on the model error by applying the candidate model to the neighbouring templates of the current block, and then compare the error with the reconstructed samples of the neighbouring template. For example, as shown in FIG. 15, the size of above neighbouring template 1520 of the current block is $w_a \times h_a$, and the size of left neighbouring template 1530 of the current block 1510 is $w_b \times h_b$. Suppose K models are in the current candidate list, and $\alpha_k$ and $\beta_k$ are the final scaling and offset parameters after inheriting the candidate k. The model error of candidate k corresponding to the above neighbouring template is:

$$e_a^k = \sum_{i,j} \left| \left( \alpha_k \times recL'^{(i,j)}_a + \beta_k \right) - recC^{(i,j)}_a \right|$$

where, $$recL'^{(i,j)}_{a} \text{ and } recC^{(i,j)}_{a}$$

are the reconstructed samples of luma (e.g., after downsampling process or after applying GLM pattern) and reconstructed samples of chroma at position (i, j) in the above template, and $0 \le i < w_a$ and $0 \le j < h_a$.

Similarly, the model error of candidate k by the left neighbouring template is:

$$e^k_b = \sum_{m,n} \left| \left(\alpha_k \times recL'^{(m,n)}_b + \beta_k\right) - recC^{(m,n)}_b \right|$$

where $$recL'^{(m,n)}_{b} \text{ and } recC^{(m,n)}_{b}$$

are the reconstructed samples of luma (e.g., after applying downsampling process or GLM pattern) and reconstructed samples of chroma at position (m, n) in the left template, and $0 \le m < w_b$ and $0 \le n < h_b$.

Then the model error of candidate k is:

$$e^k = e^k_a + e^k_b$$

After calculating the model error among all candidates, it can get a model error list $E=\{e^0, e^1, e^2, \ldots, e^k, \ldots, e^K\}$. Then, it can reorder the candidate index in the inherited candidate list by sorting the model error list in ascending order.

In still another embodiment, if the candidate k uses CCCM prediction, the $$e^k_a \text{ and } e^k_b$$

are defined as:

$$e^k_a = \sum_{i,j} \left| \left(c0_k \times recL'^{(i,j)}_a + c1_k \times recL'^{(i,j-1)}_a + c2_k \times recL'^{(i,j+1)}_a + c3_k \times recL'^{(i-1,j)}_a + c4_k \times recL'^{(i+1,j)}_a + c5_k \times P + c6_k \times B\right) - recC^{(i,j)}_a \right|$$

$$e^k_b = \sum_{i,j} \left| \left(c0_k \times recL'^{(i,j)}_b + c1_k \times recL'^{(i,j-1)}_b + c2_k \times recL'^{(i,j+1)}_b + c3_k \times recL'^{(i-1,j)}_b + c4_k \times recL'^{(i+1,j)}_b + c5_k \times P + c6_k \times B\right) - recC^{(i,j)}_b \right|$$

where $c0_k$, $c1_k$, $c2_k$, $c3_k$, $c4_k$, $c5_k$, and $c6_k$ are the final filtering coefficients after inheriting the candidate k. P and B are the nonlinear term and bias term.

In still another embodiment, if the above neighbouring template is not available, then $$e^k = e^k_b.$$

Similarly, if the left neighbouring template is not available, then $$e^k = e^k_a.$$

If both templates are not available, the candidate index reordering method using model error is not applied.

In still another embodiment, not all positions inside the above and left neighbouring template are used in calculating model error. It can choose partial positions inside the above and left neighbouring template to calculate model error. For example, it can define a first start position and a first subsampling interval depending on the width of the current block to partially select positions inside the above neighbouring template. Similarly, it can define a second start position and a second subsampling interval depending on the height of the current block to partially select positions inside the left neighbouring template. For another example, $h_a$ or $h_b$ can be a constant value (e.g., $h_a$ or $h_b$ can be 1, 2, 3, 4, 5, or 6). For another example, $h_a$ or $h_b$ can be dependent on the block size. If the current block size is greater than or equal to a threshold, $h_a$ or $h_b$ is equal to a first value. Otherwise, $h_a$ or $h_b$ is equal to a second value.

In still another embodiment, after the candidates are reordered based on the model error (template cost), the redundancy of the candidate can be further checked. A candidate is considered to be redundant if the model error difference between it and its predecessor in the list is smaller than a threshold. If a candidate is considered redundant, it can be removed from the list, or it can be move to the end of the list.

Inheriting Candidates from the Candidates in the Candidate List of Neighbours

Figure 16:
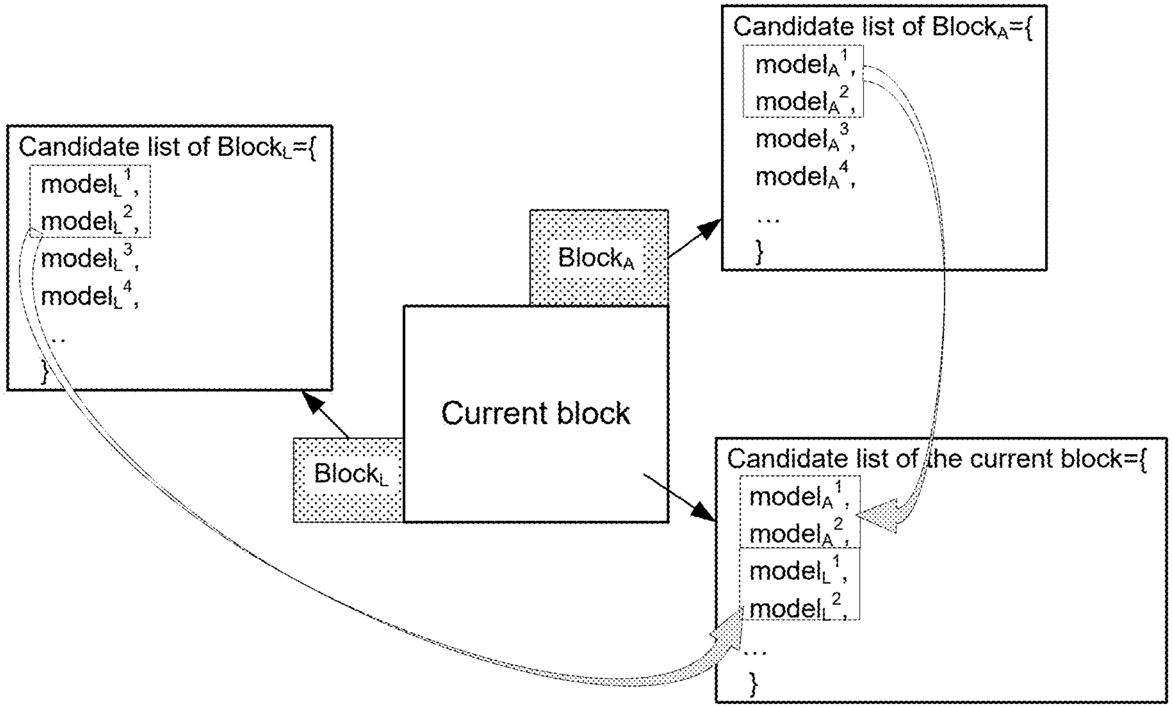
FIG. 16 illustrates an example of inheriting candidates from the candidates in the candidate list of neighbours.

The candidates in the current inherited candidate list can be from neighbouring blocks. For example, it can inherit the first k candidates in the inherited candidate list of the neighbouring blocks. As shown in the FIG. 16, the current block can inherit the first two candidates in the inherited candidate list of the above neighbouring block and the first two candidates in the inherited candidate list of the left neighbouring block. For an embodiment, after adding the neighbouring spatial candidates and non-adjacent spatial candidates, if the current inherited candidate list is not full, the candidates in the candidate list of neighbouring blocks are included into the current inherited candidate list. For another embodiment, when including the candidates in the candidate list of neighbouring blocks, the candidates in the candidate list of left neighbouring blocks are included before the candidates in the candidate list of above neighbouring blocks. For still another embodiment, when including the candidates in the candidate list of neighbouring blocks, the candidates in the candidate list of above neighbouring blocks are included before the candidates in the candidate list of left neighbouring blocks.

Signalling the Inherited Candidate Index in the List

An on/off flag can be signalled to indicate if the current block inherits the cross-component model parameters from neighbouring blocks or not. The flag can be signalled per CU/CB, per PU, per TU/TB, or per colour component, or per chroma colour component. A high level syntax can be signalled in SPS, PPS (Picture Parameter Set), PH (Picture header) or SH (Slice Header) to indicate if the proposed method is allowed for the current sequence, picture, or slice.

If the current block inherits the cross-component model parameters from neighbouring blocks, the inherited candidate index is signalled. The index can be signalled (e.g., signalled using truncate unary code, Exp-Golomb code, or fix length code) and shared among both the current Cb and Cr blocks. For another example, the index can be signalled per colour component. For example, one inherited candidate index is signalled for Cb component, and another inherited candidate index is signalled for Cr component. For another example, it can use chroma intra prediction syntax (e.g., IntraPredModeC[xCb][yCb]) to store the inherited candidate index.

If the current block inherits the cross-component model parameters from neighbouring blocks, the current chroma intra prediction mode (e.g., IntraPredModeC[xCb][yCb] as defined in VVC standard) is temporally set to a cross-component mode (e.g., CCLM_LT) at the bitstream syntax parsing stage. Later, at the prediction stage or reconstruction stage, the candidate list is derived, and the inherited candidate model is then determined by the inherited candidate index. After obtaining the inherited model, the coding information of the current block is then updated according to the inherited candidate model. The coding information of the current block includes but not limited to the prediction mode (e.g., CCLM_LT or MMLM_LT), related sub-mode flags (e.g., CCCM mode flag), prediction pattern (e.g., GLM pattern index), and the current model parameters. Then, the prediction of the current block is generated according to the updated coding information.

Inheriting Multiple Cross-Component Models

The final prediction of the current block can be the combination of multiple cross-component models, or fusion of the selected cross-component models with the prediction by non-cross-component coding tools (e.g., intra angular prediction modes, intra planar/DC modes, or inter prediction modes). In one embodiment, if the current candidate list size is N, it can select k candidates from the total N candidates (where k≤N). Then, k predictions are respectively generated by applying the cross-component model of the selected k candidates using the corresponding luma reconstruction samples. The final prediction of the current block is the combination results of these k predictions. For example, if two candidate predictions (denoted as $p_{cand1}$ and $p_{cand2}$) are combined, the final prediction at (x, y) position of the current block is $p_{final}(x, y)=(1-\alpha)\times p_{cand1}(x, y)+\alpha\times p_{cand2}(x, y)$, where α is a weighting factor. Besides, the weighting factor α can be predefined or implicitly derived by neighbouring template cost (i.e., model error). For example, by using the template cost defined in the section entitled: Reordering the candidates in the list, the corresponding template cost of two candidates are $e^{cand1}$ and $e^{cand2}$, then α is $e^{cand1}/(e^{cand1}+e^{cand2})$. In another embodiment, if two candidate models are combined, the selected models are from the first two candidates in the list. In still another embodiment, if i candidate models are combined, the selected models are from the first i candidates in the list.

In another embodiment, if the current candidate list size is N, it can select k candidates from the total N candidates (where k≤N). The k cross-component models can be combined into one final cross-component model by weighted-averaging the corresponding model parameters. For example, if a cross-component model has M parameters, the j-th parameter of the final cross-component model is the weighted-averaging of the j-th parameter of the k selected candidates, where j is 1 . . . M. Then, the final prediction is generated by applying the final cross-component model to the corresponding luma reconstructed samples. For example, if two candidate models are $$\{c_0^0, c_1^0, \ldots, c_{M-1}^0\} \text{ and } \{c_0^1, c_1^1, \ldots, c_{M-1}^1\}.$$

The final cross-component model is $$\{(1-\alpha)\times c_0^0+\alpha\times c_0^1, (1-\alpha)\times c_1^0+\alpha\times c_1^1, \ldots, (1-\alpha)\times c_{M-1}^0+\alpha\times c_{M-1}^1\},$$

where α is a weighting factor which can be predefined or implicitly derived by neighbouring template cost, and $$c_x^y$$

is the x-th model parameter of the y-th candidate. For example, by using the template cost defined in the section entitled: Reordering the candidates in the list, the corresponding template cost of two candidates are $e^{cand1}$ and $e^{cand2}$, then α is $e^{cand1}/(e^{cand1}+e^{cand2})$. For still an example, the two candidate models are one from the spatial adjacent neighbouring candidate, and another one from the non-adjacent spatial candidate or history candidate. If the spatial adjacent neighbouring candidate is not available, then the two candidate models are all from the non-adjacent spatial candidates or history candidates. In another embodiment, if two candidate models are combined, the selected models are from the first two candidates in the list. In still another embodiment, if i candidate model is combined, the selected models are from the first i candidate in the list.

In another embodiment, two cross-component models are combined into one final model by weighted-averaging the corresponding model parameters, where the two cross-component models are one from the above spatial neighbouring candidate and another one from the left spatial neighbouring candidate. The above spatial neighbouring candidate is the neighbouring candidate that has the vertical position less than or equal to the top block boundary position of the current block. The left spatial neighbouring candidate is the neighbouring candidate that has the horizontal position less than or equal to the left block boundary position of the current block. The weighting factor α is determined according to the horizontal and vertical spatial positions inside the current block. For example, if two candidate predictions (denoted as $p_{above}$ and $p_{left}$) are combined, the final prediction at (x, y) position of the current block is $p_{final}(x, y)=(1-\alpha)\times p_{above}(x, y)+\alpha\times p_{left}(x, y)$, where $\alpha=y/(x+y)$. In another embodiment, the above spatial neighbouring candidate is the first candidate in the list that has the vertical position less than or equal to the top block boundary position of the current block. The left spatial neighbouring candidate is the first candidate in the list that has the horizontal position less than or equal to the left block boundary position of the current block.

In another embodiment, it can combine cross-component model candidates with the prediction of non-cross-component coding tools. For example, one cross-component model candidate is selected from the candidate list, and its prediction is denoted as $p_{ccm}$. Another prediction can be from chroma DM, chroma DIMD, or intra angular mode, and denoted as $p_{non-ccm}$. The final prediction at (x, y) position of the current block is $p_{final}(x, y)=(1-\alpha)\times p_{ccm}(x, y)+$ $\alpha \times p_{non\text{-}ccm}(x, y)$, where $\alpha$ is the weighting factor, which can be predefined or implicitly derived by neighbouring template cost. For still the same example, the prediction by a non-cross-component coding tool can be predefined or signalled. The prediction by non-cross-component coding tool is chroma DM or chroma DIMD. For another example, prediction by non-cross-component coding tool is signalled, but the index of cross-component model candidate is predefined or determined by the coding modes of neighbouring blocks. For still the same example, if at least one of neighbouring spatial blocks is coded with CCCM mode, the first candidate has CCCM model parameters is selected. If at least one of neighbouring spatial blocks is coded with GLM mode, the first candidate has GLM pattern parameters is selected. Similarly, if at least one of neighbouring spatial blocks is coded with MMLM mode, the first candidate has MMLM parameters is selected.

In another embodiment, it can combine cross-component model candidates with the prediction by the current cross-component model. For example, one cross-component model candidate is selected from the list, and its prediction is denoted as $p_{ccm}$. Another prediction can be from the cross-component prediction mode whose model is derived by the current neighbouring reconstructed samples and denoted as $p_{curr\text{-}ccm}$. The final prediction at (x, y) position of the current block is $p_{final}(x, y)=(1-\alpha)\times p_{ccm}(x, y)+\alpha\times p_{curr\text{-}ccm}(x, y)$, where a is the weighting factor which can be predefined or implicitly derived according to neighbouring template cost. For still the same example, the prediction by the current cross-component model can be predefined or signalled. The prediction by the current cross-component coding tool is CCCM_LT, LM_LA (i.e., single model LM using both top and left neighbouring samples to derive the model), or MMLM_LT (i.e., multi-model LM using both top and left neighbouring samples to derive the model). In one embodiment, the selected cross-component model candidate is the first candidate in the list.

In another embodiment, it can combine multiple cross-component models into one final cross-component model. For example, it can choose one model from a candidate, and choose a second model from another candidate to be a multi-model mode. The selected candidate can be CCLM/MMLM/GLM/CCCM coded candidate. The multi-model classification threshold can be the average of the offset parameters (e.g., offset/$\beta$ in CCLM, or $c_6\times B$ or $c_6$ in CCCM) of the two selected modes. In one embodiment, if two candidate models are combined, the selected models are the first two candidates in the list. In another embodiment, the classification threshold is set to the average value of the neighbouring luma and chroma samples of the current block.

Refining the Inherited Candidate Positions

In one embodiment, the final inherited model of the current block is from the cross-component model at the indicated candidate position with a delta position. For example, if the current selected candidate position is $$(x^i_{nei}, y^i_{nei}),$$

it can further signal a delta position, $$(dx^i_{nei}, dy^i_{nei}),$$

to indicate the position of the final inherited model. That is, the final inherited model of the current block is from the cross-component model at $$(x^i_{nei} + dx^i_{nei}, y^i_{nei} + dy^i_{nei}).$$

In one embodiment, the signal delta position can only have a horizontal delta position or a vertical delta position, that is, $$(dx^i_{nei}, 0)\ or\ (0, dy^i_{nei}).$$

Besides, the signalled delta position can be shared among multiple colour components or signalled per colour component. For example, the signalled delta position is share for the current Cb and Cr blocks, or the signalled delta position is only used for the current Cb block or the current Cr block. Furthermore, the signalled $$dx^i_{nei}\ or\ dy^i_{nei}$$

may have a sign bit to indicate positive delta position or negative delta position. When indicating the magnitude of $$dx^i_{nei}\ or\ dy^i_{nei},$$

it can be signalled by a look-up table index. For example, a look-up table is {1, 2, 4, 8, 16, . . . }, if $$|dx^i_{nei}|$$

is equal to 8, then the table index 3 is signalled (the first table index is 0).

In one embodiment, when a candidate is selected from the candidate list, the models from the neighbouring positions of the selected candidate are further searched. The final inherited model can be from the neighbouring position of the selected candidate. Positions of a pre-defined search pattern inside an area around the selected candidate is searched. In one embodiment, the neighbouring positions searched are either horizontally different or vertically different from the position of the selected candidate, that is, the delta position is either $$(dx^i_{nei}, 0)\text{ or }(0, dy^i_{nei}).$$

In another embodiment, the neighbouring positions searched are diagonally different from the position of the selected candidate, that is, the delta position is $$(dx^i_{nei}, dy^i_{nei}),$$

where $$dx^i_{nei} = \pm dy^i_{nei}.$$

Note, the delta position can be a positive or negative number. The models from the neighbouring positions can be compared based on their template cost. The model with the smallest template cost can be the final inherited model.

In another embodiment, the models from the neighbouring positions of the candidate are further searched only when the selected candidate is a non-adjacent candidate. Positions of a pre-defined search pattern inside an area around the selected candidate are searched. For example, suppose the horizontal and vertical displacement between the position of a non-adjacent candidate and the position of the current coding block is a multiple of the width (denoted by W) and height (denoted by H) of the current coding block, respectively. After a non-adjacent candidate is selected, positions, whose horizontal distance and vertical distance from the position of the selected candidate are both smaller than the width and height of the current coding block respectively, are further searched, i.e., $$-W < dx^i_{nei} < W \text{ and } -H < dy^i_{nei} < H.$$

In one embodiment, the neighbouring positions searched are either horizontally different or vertically different from the position of the selected candidate, that is, the delta position is either $$(dx^i_{nei}, 0) \text{ or } (0, dy^i_{nei}).$$

In another embodiment, the neighbouring positions searched are diagonally different from the selected candidate, that is, the delta position is $$(dx^i_{nei}, dy^i_{nei}), \text{ where } dx^i_{nei} = \pm dy^i_{nei}.$$

Inheriting from Shared Cross-Component Models

In one embodiment, the current picture is segmented into multiple non-overlapped regions, and each region size is M×N. A shared cross-component model is derived for each region, respectively. The neighbouring available luma/chroma reconstructed samples of the current region are used to derive the shared cross-component model of the current region. Then, for a block inside the current region, it can determine whether to inherit the shared cross-component model or derive cross-component model by the neighbouring available luma/chroma reconstructed samples of the block. In one embodiment, the M×N can be a predefined value (e.g. 32×32 regarding to the chroma format), a signalled value (e.g. signalled in sequence/picture/slice/tile-level), a derived value (e.g. depending on the CTU size), or the maximum allowed transform block size.

In another embodiment, each region may have more than one shared cross-component model. For example, it can use various neighbouring templates (e.g., top and left neighbouring samples, top-only neighbouring samples, left-only neighbouring samples) to derive more than one shared cross-component model. Besides, the shared cross-component models of the current region can be inherited from previously used cross-component models. For example, the shared model can be inherited from the models of adjacent spatial neighbours, non-adjacent spatial neighbours, temporal neighbours, or from a historical list.

When doing signalling, a first flag can be used to determine if the current cross-component model is inherited from the shared cross-component models or not. If the current cross-component model is inherited from the shared cross-component models, the second syntax indicate the inherited index of the shared cross-component models (e.g., signalled using truncate unary code, Exp-Golomb code, or fix length code).

Figure 1B:
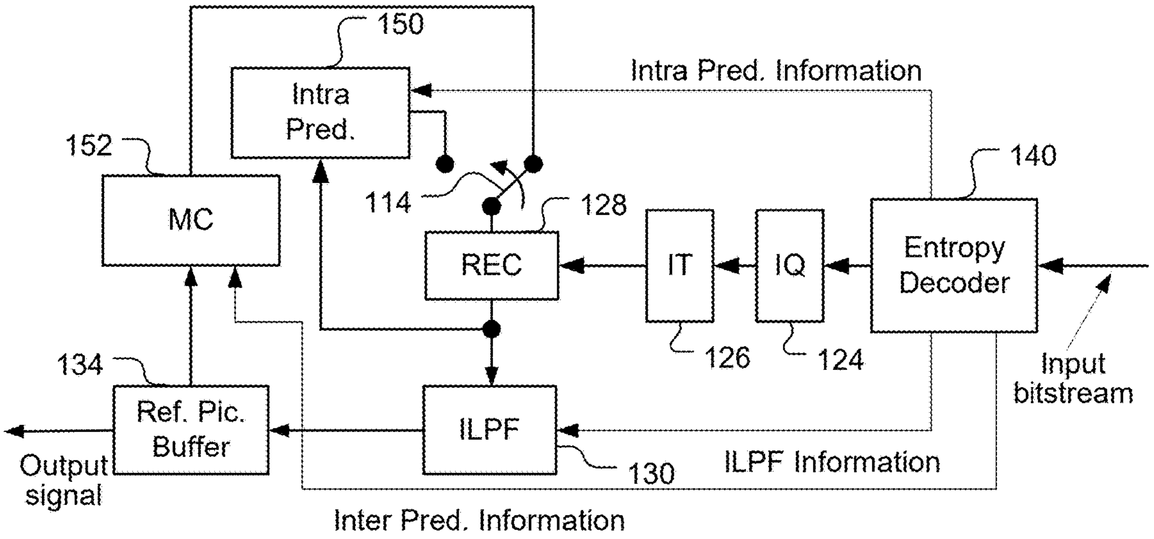
FIG. 1B illustrates a corresponding decoder for the encoder in FIG. 1A.
Figure 2:
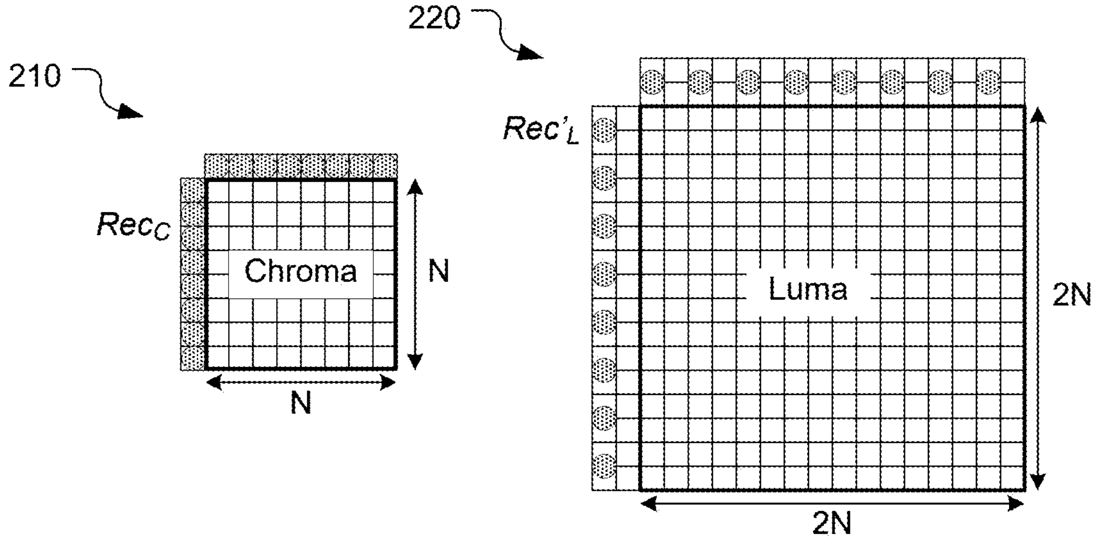
FIG. 2 shows an example of the location of the left and above samples and the sample of the current block involved in the LM_LA mode.
Figure 3:
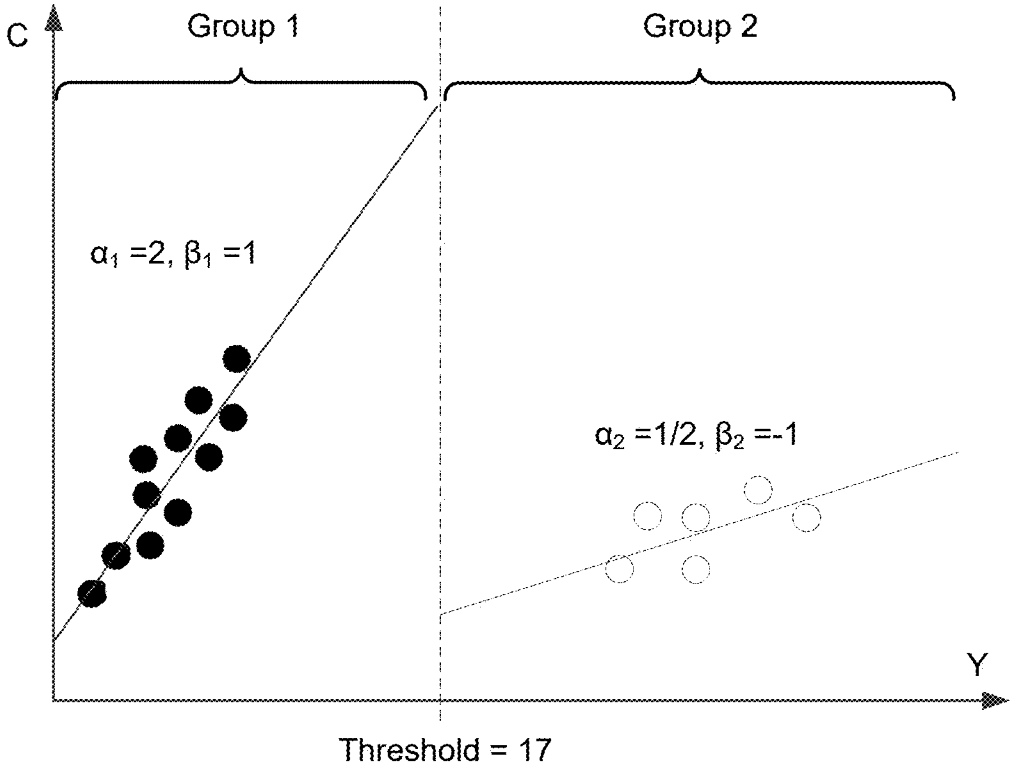
FIG. 3 shows an example of classifying the neighbouring samples into two groups according to multiple mode CCLM.
Figure 4A:
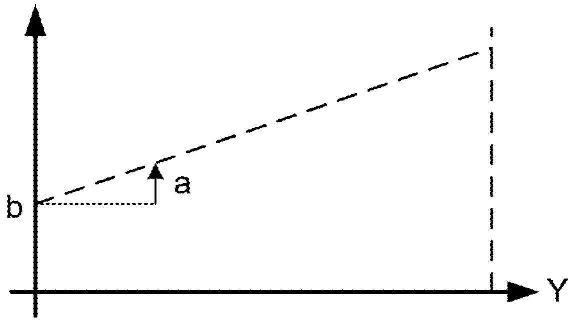
FIG. 4A illustrates an example of the CCLM model.
Figure 4B:
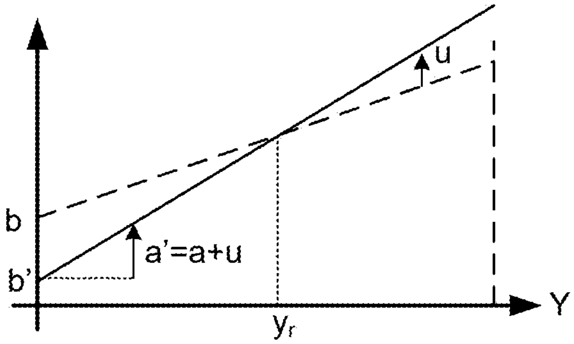
FIG. 4B illustrates an example of the effect of the slope adjustment parameter "u" for model update.
Figure 5:
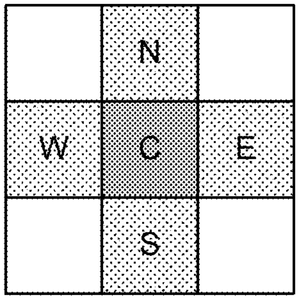
FIG. 5 illustrates an example of spatial part of the convolutional filter.
Figure 6:
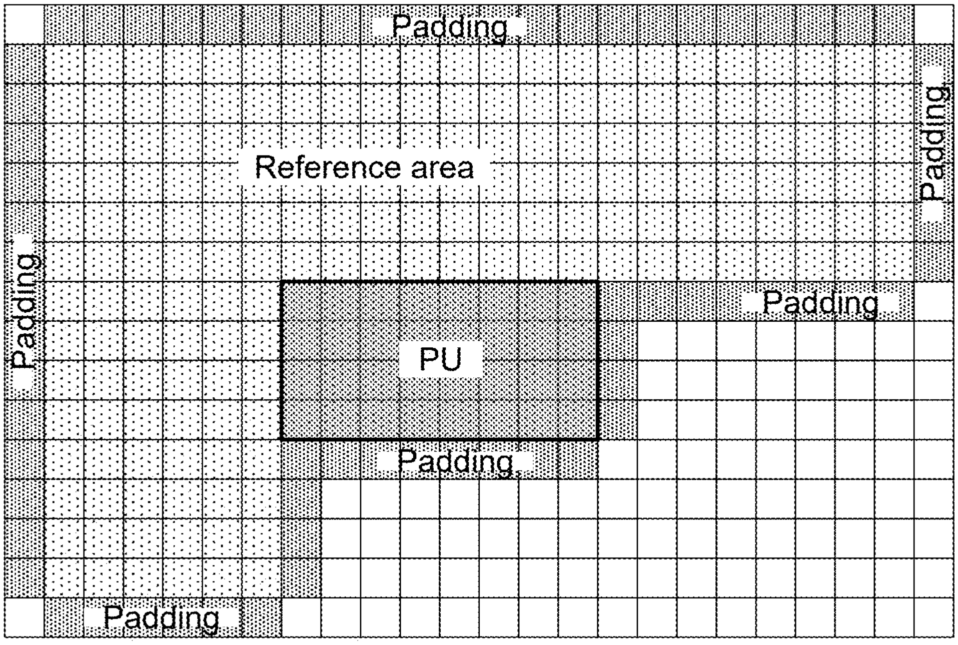
FIG. 6 illustrates an example of reference area with paddings used to derive the filter coefficients.

The cross component prediction with inherited model parameters as described above can be implemented in an encoder side or a decoder side. For example, any of the proposed cross component prediction methods can be implemented in an Intra/Inter coding module (e.g. Intra Pred. 150/MC 152 in FIG. 1B) in a decoder or an Intra/Inter coding module is an encoder (e.g. Intra Pred. 110/Inter Pred. 112 in FIG. 1A). Any of the proposed cross component prediction with inherited model parameters methods can also be implemented as a circuit coupled to the intra/inter coding module at the decoder or the encoder. However, the decoder or encoder may also use additional processing unit to implement the required CCLM processing. While the Intra Pred. units (e.g. unit 110/112 in FIG. 1A and unit 150/152 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 17:
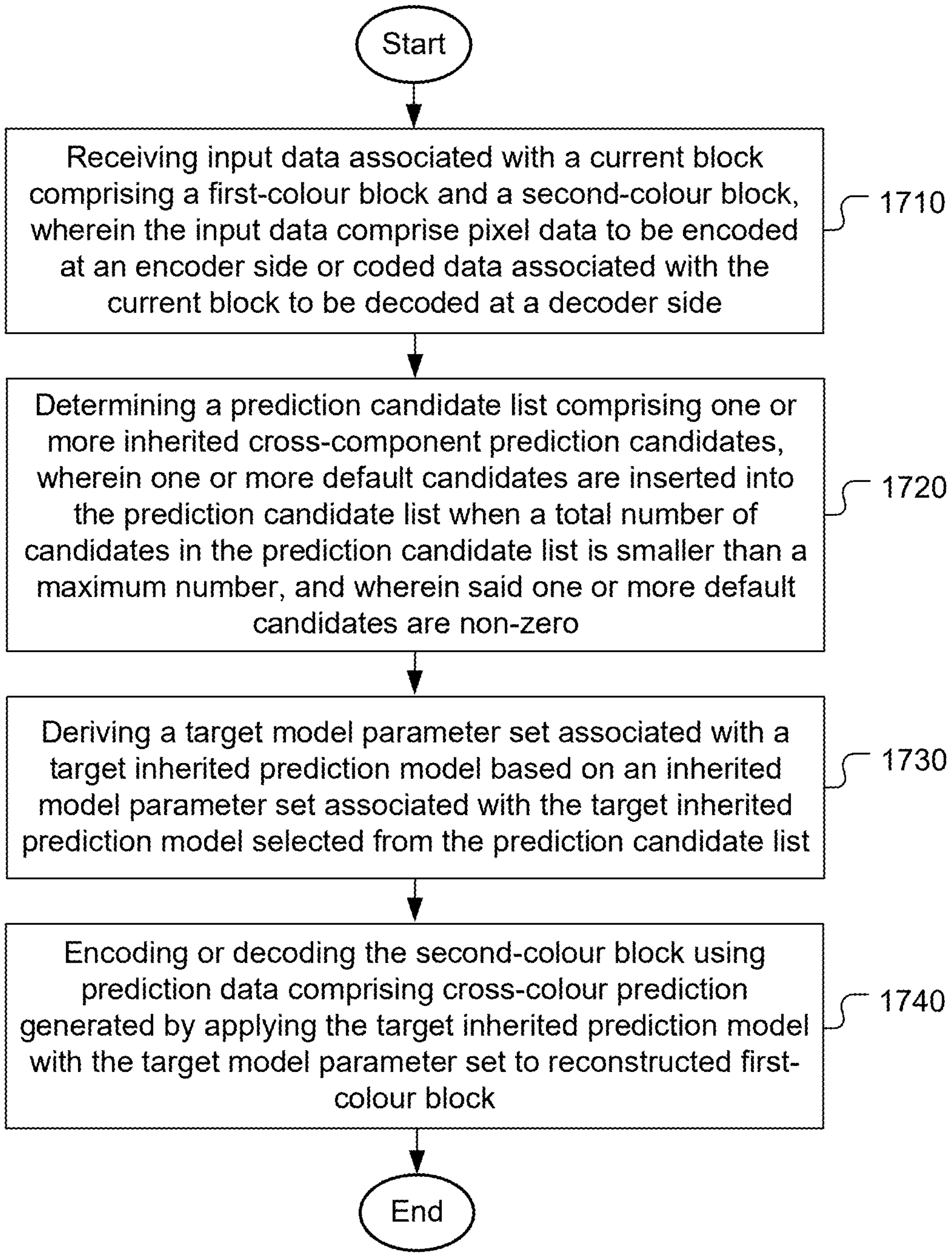
FIG. 17 illustrates a flowchart of an exemplary video coding system that incorporates inheriting model parameters for cross-component prediction according to an embodiment of the present invention.

FIG. 17 illustrates a flowchart of an exemplary video coding system that incorporates inheriting model parameters for cross-component prediction according to an embodiment of the present invention. The steps shown in the flowchart may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to the method, input data associated with a current block comprising a first-colour block and a second-colour block are received in step 1710, wherein the input data comprise pixel data to be encoded at an encoder side or coded data associated with the current block to be decoded at a decoder side. A prediction candidate list comprising one or more inherited cross-component prediction candidates is determined in step 1720, wherein one or more default candidates are inserted into the prediction candidate list when a total number of candidates in the prediction candidate list is smaller than a maximum number, and wherein said one or more default candidates are non-zero. A target model parameter set associated with a target inherited prediction model is derived based on an inherited model parameter set associated with the target inherited prediction model selected from the prediction candidate list in step 1730. The second-colour block is encoded or decoded using prediction data comprising cross-component prediction generated by applying the target inherited prediction model with the target model parameter set to reconstructed first-colour block in step 1740.

Figure 18:
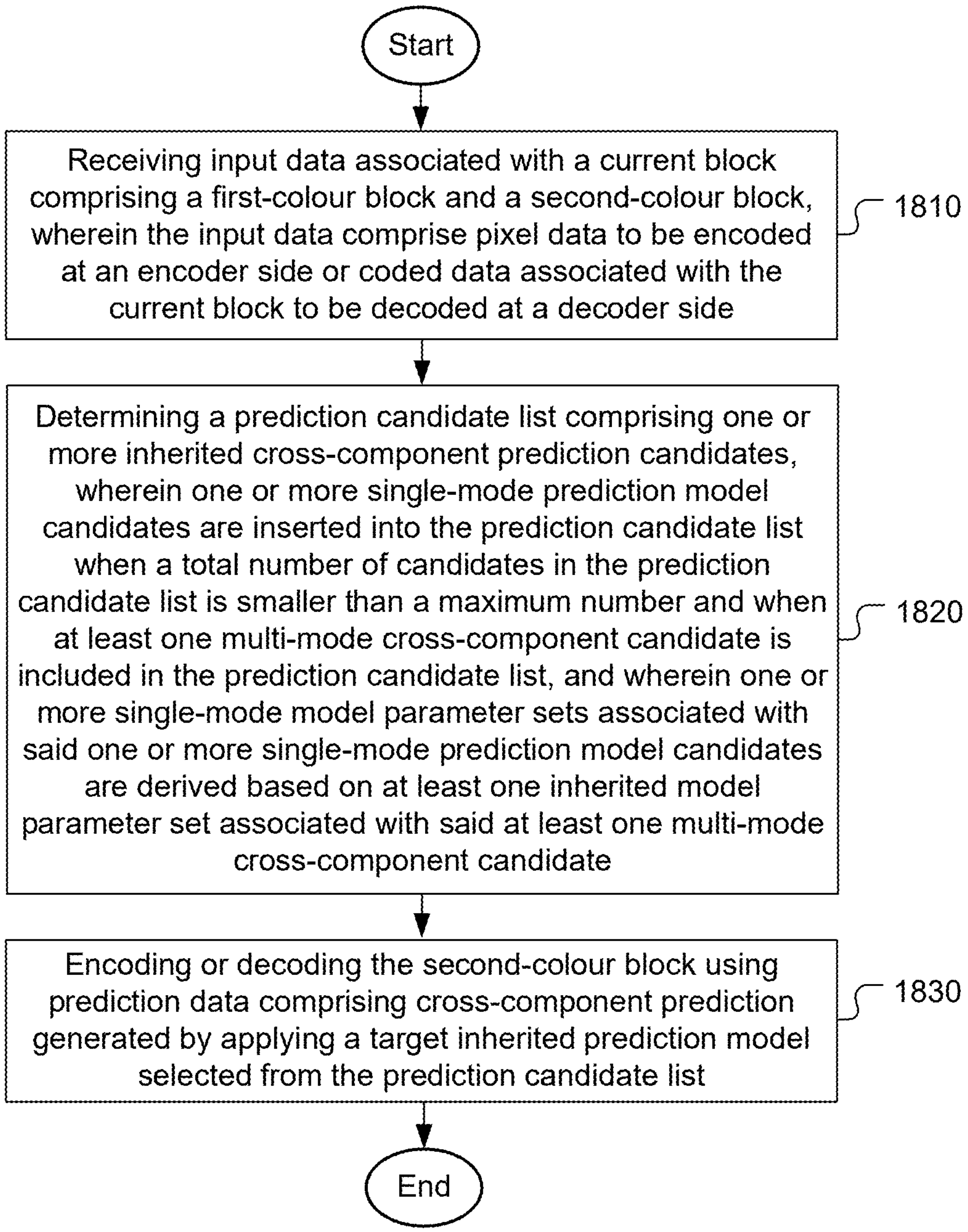
FIG. 18 illustrates a flowchart of another exemplary video coding system that incorporates intra-prediction mode blending according to an embodiment of the present invention.

FIG. 18 illustrates a flowchart of an exemplary video coding system that incorporates inheriting model parameters for cross-component prediction according to an embodiment of the present invention. According to the method, input data associated with a current block comprising a first-colour block and a second-colour block are received in step 1810, wherein the input data comprise pixel data to be encoded at an encoder side or coded data associated with the current block to be decoded at a decoder side. A prediction candidate list comprising one or more inherited cross-component prediction candidates is determined in step 1820, wherein one or more single-mode prediction model candidates are inserted into the prediction candidate list when a total number of candidates in the prediction candidate list is smaller than a maximum number and when at least one multi-mode cross-component candidate is included in the prediction candidate list, and wherein one or more single-mode model parameter sets associated with said one or more single-mode prediction model candidates are derived based on at least one inherited model parameter set associated with said at least one multi-mode cross-component candidate. The second-colour block is encoded or decoded using prediction data comprising cross-component prediction generated by applying a target inherited prediction model selected from the prediction candidate list in step 1830.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding colour pictures using coding tools including one or more cross-component models related modes, the method comprising:

receiving input data associated with a current block comprising a first-colour block and a second-colour block, wherein the input data comprise pixel data to be encoded at an encoder side or coded data associated with the current block to be decoded at a decoder side;

determining a prediction candidate list comprising one or more inherited cross-component prediction candidates, wherein one or more default candidates are inserted into the prediction candidate list when a total number of candidates in the prediction candidate list is smaller than a maximum number, and wherein said one or more default candidates are non-zero and wherein said one or more default candidates correspond to one or more cross-component mode candidates and are derived based on an earlier candidate in the candidate list;

deriving a target model parameter set associated with a target inherited prediction model based on an inherited model parameter set associated with the target inherited prediction model selected from the prediction candidate list; and encoding or decoding the second-colour block using prediction data comprising cross-component prediction generated by applying the target inherited prediction model with the target model parameter set to reconstructed first-colour block.

2. The method of claim 1, wherein said one or more default candidates comprise a target default candidate having a final scaling parameter and a pre-defined offset parameter, wherein the final scaling parameter is selected from a pre-defined set.

3. The method of claim 2, wherein the pre-defined set corresponds to {0, +1/8, −1/8, +2/8, −2/8, +3/8, −3/8, +4/8, −4/8, . . . , +N/8, −N/8}, N is a positive integer.

4. The method of claim 1, wherein said one or more default candidates comprise a target default candidate having a final scaling parameter corresponding to a sum of a previous scaling factor and a delta scaling factor, and wherein the delta scaling factor is selected from a pre-defined set.

5. The method of claim 4, wherein the pre-defined set corresponds to {+1/8, −1/8, +2/8, −2/8, +3/8, −3/8, +4/8, −4/8, . . . , +N/8, −N/8}, N is a positive integer.

6. The method of claim 1, wherein said one or more default candidates correspond to one or more cross-component mode candidates and each with a scaling parameter a and a pre-defined offset parameter, wherein the pre-defined offset parameter is related to bit depth of the current block or is derived based on neighbouring first-colour samples and neighbouring second-colour samples.

7. The method of claim 6, wherein the pre-defined offset parameter is equal to (SecondColourAverage−α×FirstColourAverage), wherein FirstColourAverage corresponds to an average of the neighbouring first-colour samples and SecondColourAverage corresponds to an average of the neighbouring second-colour samples.

8. The method of claim 1, wherein said one or more default candidates correspond to one or more cross-component mode candidates and are inserted into the prediction candidate list according to an order depending on absolute values of scaling parameters or refined scaling parameters associated with cross-component models of said one or more default candidates.

9. The method of claim 8, wherein one default candidate with a first absolute value is inserted into the prediction candidate list before another default candidate with a second absolute value larger than the first absolute value.

10. The method of claim 1, wherein said one or more default candidates correspond to one or more GLM (Gradient Linear Model) candidates and are inserted into the prediction candidate list according to an order depending on absolute values of GLM model scaling parameters and GLM filter type associated with said one or more default candidates.

11. The method of claim 10, wherein one default candidate with a first absolute value is inserted into the prediction candidate list before another default candidate with a second absolute value larger than the first absolute value.

12. The method of claim 10, wherein two or more default candidates with a same GLM filter type are inserted into the prediction candidate list consecutively.

13. The method of claim 1, wherein said one or more inherited cross-component prediction candidates comprise one or more inherited spatial neighboring candidates and/or non-adjacent spatial neighbouring candidates.

14. The method of claim 13, wherein said one or more inherited spatial neighbouring candidates and/or non-adjacent spatial neighboring candidates at pre-defined positions are added into the prediction candidate list in a pre-defined order.

15. An apparatus for video coding, the apparatus comprising one or more electronics or processors arranged to:

receive input data associated with a current block comprising a first-colour block and a second-colour block, wherein the input data comprise pixel data to be encoded at an encoder side or coded data associated with the current block to be decoded at a decoder side;

determine a prediction candidate list comprising one or more inherited cross-component prediction candidates, wherein one or more default candidates are inserted into the prediction candidate list when a total number of candidates in the prediction candidate list is smaller than a maximum number, and wherein said one or more default candidates are non-zero and wherein said one or more default candidates correspond to one or more cross-component mode candidates and are derived based on an earlier candidate in the candidate list;

derive a target model parameter set associated with a target inherited prediction model based on an inherited model parameter set associated with the target inherited prediction model selected from the prediction candidate list; and encode or decode the second-colour block using prediction data comprising cross-component prediction generated by applying the target inherited prediction model with the target model parameter set to reconstructed first-colour block.

16. A method of coding colour pictures using coding tools including one or more cross-component models related modes, the method comprising:

receiving input data associated with a current block comprising a first-colour block and a second-colour block, wherein the input data comprise pixel data to be encoded at an encoder side or coded data associated with the current block to be decoded at a decoder side;

determining a prediction candidate list comprising one or more inherited cross-component prediction candidates, wherein one or more single-mode prediction model candidates are inserted into the prediction candidate list when a total number of candidates in the prediction candidate list is smaller than a maximum number and when at least one multi-mode cross-component candidate is included in the prediction candidate list, and wherein one or more single-mode model parameter sets associated with said one or more single-mode prediction model candidates are derived based on at least one inherited model parameter set associated with said at least one multi-mode cross-component candidate; and encoding or decoding the second-colour block using prediction data comprising cross-component prediction generated by applying a target inherited prediction model selected from the prediction candidate list.

17. The method of claim 16, wherein said at least one multi-mode cross-component candidate corresponds to MMLM (Multiple Model CCLM (Cross-Component Linear Model)), or CCCM (Convolutional Cross-Component Model) with multi-model.

18. The method of claim 16, wherein one of said one or more single-mode prediction model candidates inserted into the prediction candidate list corresponds to one of two models associated with said at least one multi-mode cross-component candidate.

19. An apparatus for video coding, the apparatus comprising one or more electronics or processors arranged to:

receive input data associated with a current block comprising a first-colour block and a second-colour block, wherein the input data comprise pixel data to be encoded at an encoder side or coded data associated with the current block to be decoded at a decoder side;

determine a prediction candidate list comprising one or more inherited cross-component prediction candidates, wherein one or more single-mode prediction model candidates are inserted into the prediction candidate list when a total number of candidates in the prediction candidate list is smaller than a maximum number and when at least one multi-mode cross-component candidate is included in the prediction candidate list, and wherein one or more single-mode model parameter sets associated with said one or more single-mode prediction model candidates are derived based on at least one inherited model parameter set associated with said at least one multi-mode cross-component candidate; and encode or decode the second-colour block using prediction data comprising cross-component prediction generated by applying a target inherited prediction model selected from the prediction candidate list.

* * * * *